United States Patent
Murakami

(10) Patent No.: US 8,824,018 B2
(45) Date of Patent: Sep. 2, 2014

(54) IMAGE PROCESSING APPARATUS, IMAGE FORMING APPARATUS, IMAGE READING APPARATUS, IMAGE PROCESSING METHOD, AND RECORDING MEDIUM

(75) Inventor: Yoshinori Murakami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 208 days.

(21) Appl. No.: 13/536,442

(22) Filed: Jun. 28, 2012

(65) Prior Publication Data
US 2013/0003149 A1    Jan. 3, 2013

(30) Foreign Application Priority Data
Jul. 1, 2011    (JP) .................................. 2011-147554

(51) Int. Cl.
G06T 5/00    (2006.01)

(52) U.S. Cl.
USPC ....... 358/3.26; 358/3.13; 358/1.11; 358/1.13; 358/462; 358/463; 382/176; 382/275

(58) Field of Classification Search
USPC ............. 358/1.9, 3.13, 3.23, 3.26, 1.11, 1.13, 358/538, 463, 462; 382/176, 190, 275
See application file for complete search history.

(56) References Cited

U.S. PATENT DOCUMENTS 7,733,534 B2 *    6/2010    Murakami ................... 358/3.13
2010/0157386 A1    6/2010    Okumura

FOREIGN PATENT DOCUMENTS

| JP | 2002-232708 A | 8/2002 |
| JP | 2006-333431 A | 12/2006 |
| JP | 2010-63091 A | 3/2010 |

* cited by examiner

Primary Examiner — Jamares Q Washington
(74) Attorney, Agent, or Firm — Birch, Stewart, Kolasch & Birch, LLP

(57) ABSTRACT

In a case where a line noise suppression mode in which a line noise image is suppressed is enabled by a mode setting section 81, (A) a spatial filter process section 108 executes a spatial filter process with respect to a text pixel which have determined to be included in a text region by a segmentation process section 105, in which spatial filter process an edge enhancement degree of an image is smaller than that obtained when the line noise suppression mode is disabled, and (B) an output tone correction section 109 executes, with respect to the text pixel subjected to the spatial filter process, a tone correction process in which a contrast enhancement degree of an image is higher than that obtained when the line noise suppression mode is disabled.

13 Claims, 14 Drawing Sheets

FIG. 4

| INPUT DENSITY VALUE x | QUANTIZED VALUE |
|---|---|
| 0 ≦ x < Th[i][0] | Out[0] |
| Th[i][0] ≦ x < Th[i][1] | Out[1] |
| Th[i][1] ≦ x < Th[i][2] | Out[2] |
| Th[i][2] ≦ x < Th[i][3] | Out[3] |
| Th[i][3] ≦ x < Th[i][4] | Out[4] |
| Th[i][4] ≦ x < Th[i][5] | Out[5] |
| Th[i][5] ≦ x < Th[i][6] | Out[6] |
| Th[i][6] ≦ x < Th[i][7] | Out[7] |
| Th[i][7] ≦ x < Th[i][8] | Out[8] |
| Th[i][8] ≦ x < Th[i][9] | Out[9] |
| Th[i][9] ≦ x < Th[i][10] | Out[10] |
| Th[i][10] ≦ x < Th[i][11] | Out[11] |
| Th[i][11] ≦ x < Th[i][12] | Out[12] |
| Th[i][12] ≦ x < Th[i][13] | Out[13] |
| Th[i][13] ≦ x < Th[i][14] | Out[14] |
| Th[i][14] ≦ x ≦ 255 | Out[15] |

FIG. 5

|  |  |  | 30 | 22 | 34 | ~SECOND SUBMATRIX |
|---|---|---|---|---|---|---|
| 28 | 20 | 32 | 38 | 2 | 6 |  |
| FIRST SUBMATRIX~ 36 | 0 | 4 | 18 | 10 | 14 | 26 |
| 16 | 8 | 12 | 24 | 29 | 21 | 33 ~FOURTH SUBMATRIX |
|  | 31 | 23 | 35 | 37 | 1 | 5 |
| THIRD SUBMATRIX~ 39 | 3 | 7 | 17 | 9 | 13 | 25 |
|  | 19 | 11 | 15 | 27 |  |  |

FIG. 8

```
                    ┌────┬────┬────┐
                    │ 15 │ 11 │ 17 │──SECOND SUBMATRIX
        ┌────┬────┬────┼────┼────┤
        │ 14 │ 10 │ 16 │ 19 │  1 │  3 │
        ├────┼────┼────┼────┼────┼────┬────┐
FIRST SUBMATRIX─│ 18 │  0 │  2 │  9 │  5 │  7 │ 13 │
        ├────┼────┼────┼────┤
        │  8 │  4 │  6 │ 12 │
        └────┴────┴────┴────┘
```

| -1 | -3 | -3 | -3 | -1 |
|---|---|---|---|---|
| -3 | -5 | -5 | -5 | -3 |
| -3 | -5 | 127 | -5 | -3 |
| -3 | -5 | -5 | -5 | -3 |
| -1 | -3 | -3 | -3 | -1 |

FIG. 11 (b)

| 0 | 0 | 0 | 0 | 0 |
|---|---|---|---|---|
| 0 | 1 | 1 | 1 | 0 |
| 0 | 1 | 1 | 1 | 0 |
| 0 | 1 | 1 | 1 | 0 |
| 0 | 0 | 0 | 0 | 0 |

FIG. 11 (c)

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

IMAGE PROCESSING APPARATUS, IMAGE FORMING APPARATUS, IMAGE READING APPARATUS, IMAGE PROCESSING METHOD, AND RECORDING MEDIUM

This Nonprovisional application claims priority under 35 U.S.C. §119 on Patent Application No. 2011-147554 filed in Japan on Jul. 1, 2011, the entire contents of which are hereby incorporated by reference.

TECHNICAL FIELD

The present invention relates to an image processing apparatus, an image forming apparatus, an image reading apparatus, an image processing method, and a recording medium, each of which has a function (A) of removing a line noise which does not exist in the document from image data which is obtained by carrying out a reading operation with respect to a document while carrying the document or (B) of making the line noise undistinguished on the image data.

BACKGROUND ART

When image data obtained by reading a document in an image reading apparatus which carries a document is printed out by a printer or is displayed to a display, line noise images along a document carrying direction (sub scanning direction) sometimes appear in an image. The line noise images are caused by foreign matters (such as dust or paper dust from document paper which is carried) adhered to a glass serving as a scanner platen surface or by scratches on the glass. Such line noise images appear as black line noise on a background part which is a blank part, or appear as white line noise on an image part read from the document. Therefore, for an image forming apparatus, such line noise images are desired to be eliminated because the image forming apparatus is required to provide image data which is the same as the image of the document.

For example, Patent Document 1 proposes a technique relating to removal of a line noise image. Patent Document 1 discloses processing in which (A) a location of line noise caused by a foreign matter is detected and then (B) a pixel value of a pixel which (i) is determined to be line noise and (ii) has low possibility that an image of a document appears is replaced with a pixel value based on pixel values of peripheral pixels. By carrying out such processing, a line noise image can be eliminated or less visible. This prevents reduction in image quality.

CITATION LIST

Patent Documents

Patent Document 1
Japanese Patent Application Publication, Tokukai, No. 2010-63091 A (Publication date: Mar. 18, 2010)
Patent Document 2
Japanese Patent Application Publication, Tokukai, No. 2002-232708 A (Publication date: Aug. 16, 2002)
Patent Document 3
Japanese Patent Application Publication, Tokukai, No. 2006-333431 A (Publication date: Dec. 7, 2006)

SUMMARY OF INVENTION

Technical Problem

However, the technique disclosed in Patent Document 1 needs, with respect to respective documents to be read one by one, not only a normal reading operation but also another reading operation which is carried out before a predetermined location between a document and a document immediately before the document (or immediately after the document) reaches a reading position of a reading section. To put it another way, the technique of Patent Document 1 needs to detect a location of a line noise image by operating a complicated operation control. In addition, the technique of Patent Document 1 cannot detect a line noise image in a case where one piece of document paper is read.

The present invention has been made in view of the problem, and an object of the present invention is to provide (A) an image processing apparatus in which (i) a location of a line noise image does not need to be detected by a complicated operation control and (ii) a line noise image (line noise image data) which does not exist in a document image but exists in input image data corresponding to the document image is eliminated or is less visible as possible by easy processing even if a document to be read is one piece of paper, (B) an image forming apparatus including the image processing apparatus, (C) an image reading apparatus including the image processing apparatus, (D) an image processing method, (E) an image processing program, and (F) a recording medium.

Solution to Problem

In order to attain the foregoing object, an image processing apparatus in accordance with the present invention includes: a region discrimination section for discriminating regions to which respective pixels of input image data belong so as to determine at least a text region; a spatial filter process section for carrying out a spatial filter process with respect to the input image data in accordance with a result discriminated by the region discrimination section; an output tone correction section for carrying out a tone correction process with respect to the input image data in accordance with the result discriminated by the region discrimination section; and a mode setting section for enabling a line noise suppression mode in which a line noise image which does not exist in a document image of the input image data but exists in the input image data is suppressed, wherein, in a case where the line noise suppression mode is enabled by the mode setting section: the spatial filter process section carries out the spatial filter process with respect to a text pixel which has been determined to be included in a text region by the region discrimination section, in which spatial filter process an edge enhancement degree of an image is smaller than that obtained when the line noise suppression mode is disabled, and the output tone correction section carries out the tone correction process with respect to the text pixel which has been subjected to the spatial filter process, in which tone correction process a contrast enhancement degree of an image is higher than that obtained when the line noise suppression mode is disabled.

Advantageous Effects of Invention

According to the arrangement of the present invention, it is possible to maintain a difference between (i) a range of pixel values of pixels corresponding to a line noise image and (ii) a range of pixel values of text pixels which exist in a document image by carrying out a spatial filter process in which an edge enhancement degree of an image is smaller than that obtained when the line noise suppression mode is disabled. Further, as described in the present invention, the difference between the ranges of the pixel values is enhanced by carrying out a tone correction process, in which a contrast enhancement degree of an image is higher than that obtained when the line noise suppression mode is disabled, with respect to the text pixel subjected to the spatial filter process in which the edge enhancement degree of the image is smaller. That is, a pixel of a text image which is thicker than a line noise image is mostly reproduced as an image which is set to a constant output value. Meanwhile, a pixel corresponding to a thin line which is a line noise image is set to be a no-image state and is eliminated.

As described above, in the present invention, when the line noise suppression mode is enabled, the spatial filter process section and the output tone correction section execute the foregoing process. This makes it possible to eliminate a line noise image (line noise image data) which does not exist in a document image for input image data but exists in the input image data corresponding to the document image, or to make the line noise image as less visible as possible. Therefore, in the present invention, there is no need to detect a location of a line noise image with a complicated operation control and it is easily possible (i) to eliminate a line noise image which does not exist in a document image but exists in input image data corresponding to the document image or (ii) to make the line noise image as less visible as possible irrespective of the number of document sheets (i.e., irrespective of one sheet or a plurality of sheets).

BRIEF DESCRIPTION OF DRAWINGS

FIG. 4 is a view illustrating a table for use in the tone reproduction process of the tone reproduction processing section, which table shows a correspondence relationship between ranges of density values and respective output values.

FIG. 5 is a view illustrating a dither matrix for use in a tone reproduction process of a tone reproduction processing section.

FIG. 8 is a view illustrating another example of the dither matrix.

FIG. 11 (*a*) is a view illustrating an example of a filter coefficient for use in a spatial filtering processing section.

FIG. 11 (*b*) is a view illustrating another example of the filter coefficient for use in the spatial filtering processing section.

FIG. 11 (*c*) is a view illustrating still another example of the filter coefficient for use in the spatial filtering processing section.

DESCRIPTION OF EMBODIMENTS

Embodiments of the present invention will be described below with reference to FIG. 1 through FIG. 16.

Embodiment 1

Image Forming Apparatus

Figure 1:
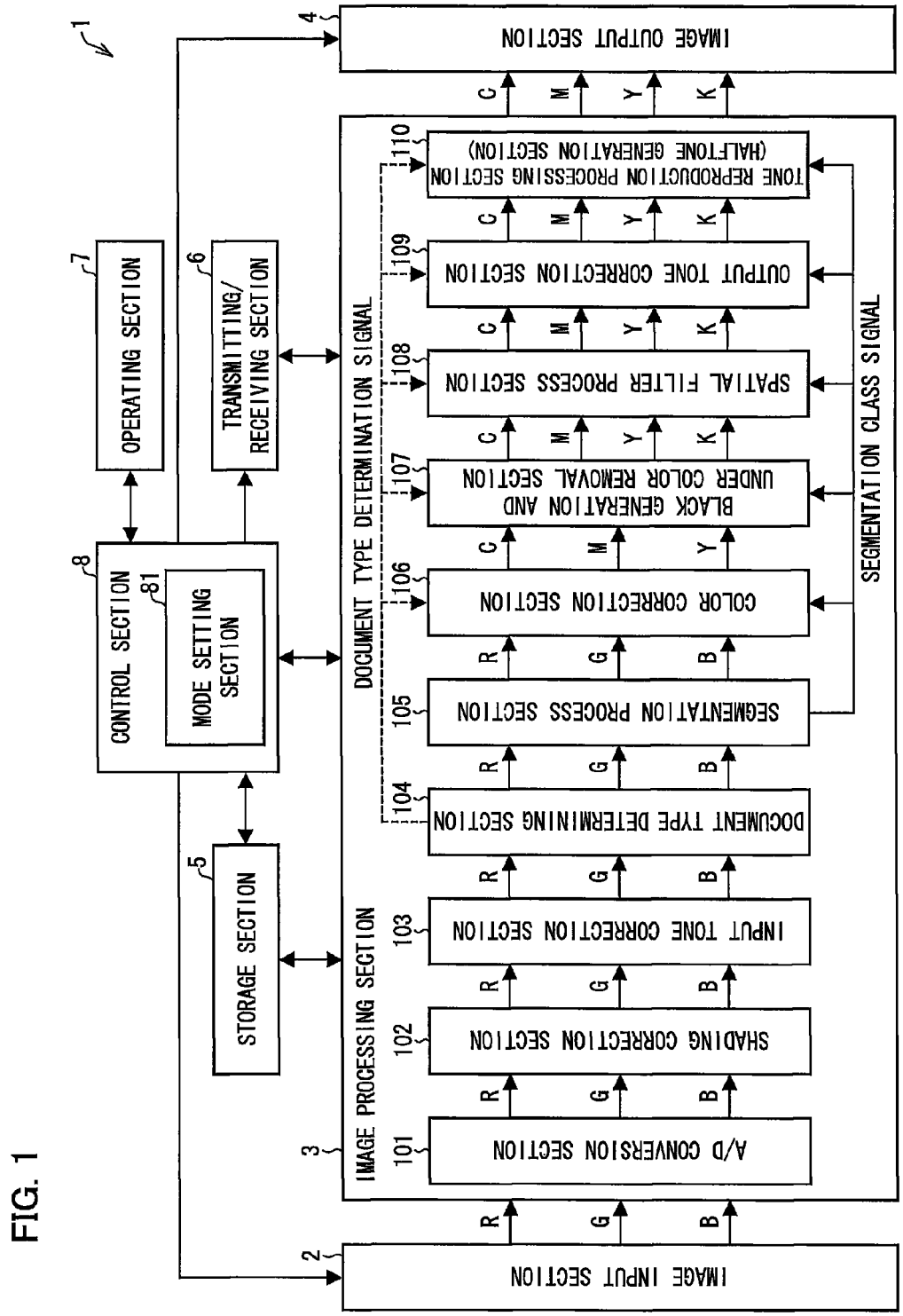
FIG. 1 is a block diagram illustrating a configuration of an image forming apparatus which is one embodiment of the present invention.

FIG. 1 is a block diagram illustrating a configuration of an image forming apparatus which is one embodiment of the present invention. An image forming apparatus 1 of Embodiment 1 is a digital color multifunction peripheral (MFP) which has a plurality of functions such as a copy function, a scan function, a print function, a fax transmitting/receiving function, and an image transmitting function. Note that the image transmitting function includes (i) a function (scan to e-mail) of transmitting, via e-mail, image data which is read and generated with the use of the scan function and (ii) a function (scan to USB) of storing the image data in the USB. Note that functions, which the image forming apparatus 1 has, are not limited to the functions. Also note that the image forming apparatus 1 does not need to have all the functions. Therefore, the image forming apparatus 1 can include one or more of all the functions.

As illustrated in FIG. 1, the image forming apparatus 1 includes an image input section (image input apparatus) 2, an image processing section (image processing apparatus) 3, an image output section (image output apparatus) 4, a storage section 5, a transmitting/receiving section 6, an operating section 7, and a control section 8.

Figure 2:
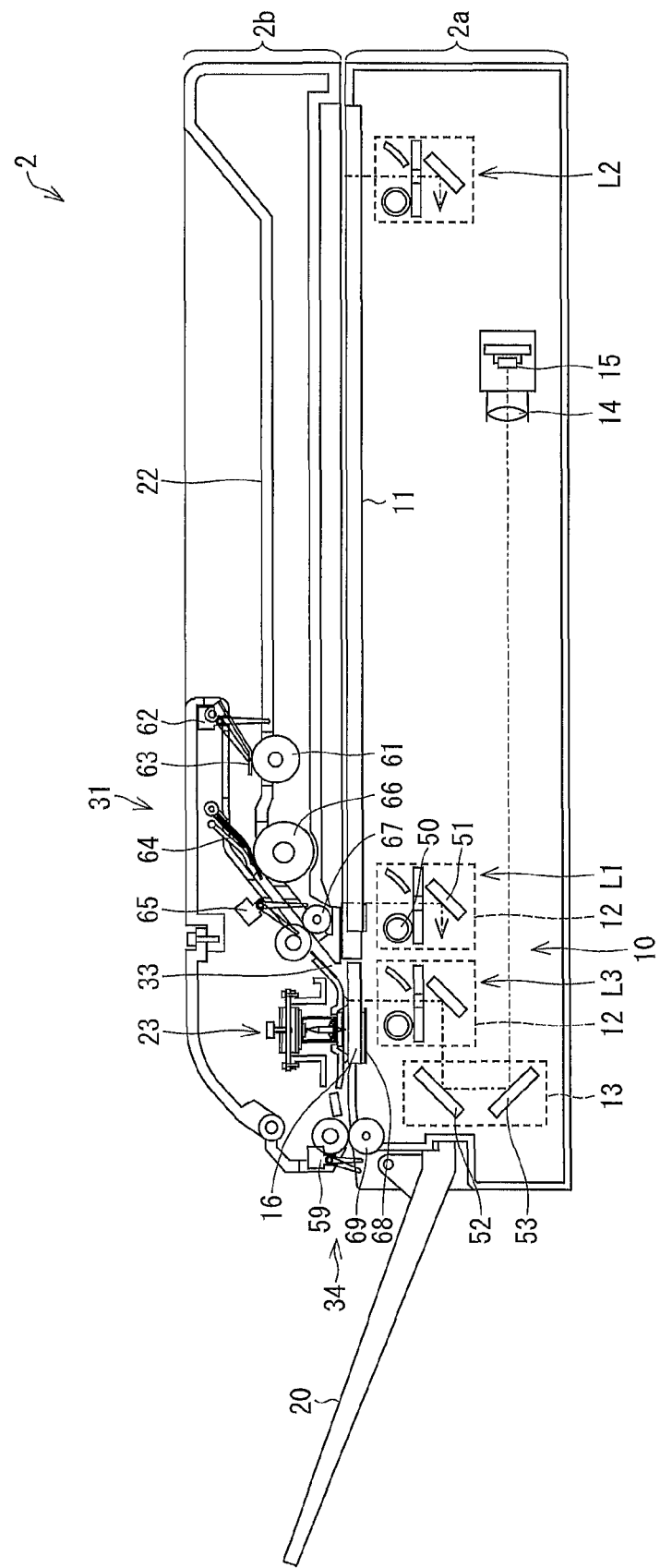
FIG. 2 is an explanatory view illustrating how an image input section included in the image forming apparatus is configured.

FIG. 2 is a view illustrating how the image input section 2 is configured. The image input section 2 includes a lower housing 2*a*, an upper housing 2*b*, and a paper output tray 20.

As illustrated in FIG. 2, the lower housing 2*a* includes a first reading section 10, a first contact glass 11, and a second contact glass 16. The first contact glass 11 functions as a platen (scanner platen) on which a document to be read is placed in a static-sheet reading mode. The first reading section 10 functions as a scanner, and includes a first scanning unit 12, a second scanning unit 13, an image focusing lens 14, and a CCD (charge coupled device) 15.

The first scanning unit 12 causes a document to be exposed to light while moving at a regular speed V in one direction along the first contact glass 11 (sub scanning direction; direction from left to right in FIG. 2). This causes light reflected from the document to be directed toward the second scanning unit 13. The first scanning unit 12 includes (i) a light source (exposure lamp) 50 for causing the document to be exposed to light and (ii) a first reflection mirror 51 for directing light reflected from the document toward the second scanning unit 13.

The second scanning unit 13 is provided for directing the light reflected from the first reflection mirror 51 toward the image focusing lens 14. The second scanning unit 13 includes (i) a second reflection mirror 52 for directing the light directed by the first scanning unit 12 toward a following third reflection mirror 53 and (ii) the third reflection mirror 53 for directing the light reflected from the second reflection mirror 52 toward the image focusing lens 14 (later described). The second scanning unit 13 moves at a speed V/2 while following the first scanning unit 12.

The image focusing lens 14 is provided for causing the light, reflected from the third reflection mirror 53, to be focused into image on an image sensing surface of the CCD 15.

The CCD 15 is a line sensor in which a plurality of light receiving elements (pixels) are arranged in one direction. The CCD 15 converts received light into analog electric signals. The electric signals are converted into digital image data by the image processing section 3 (described later). Alternatively, the electric signals can be converted into digital image data in the image input section 2.

Note that a document reference plate (not illustrated) is provided, in place, in an end part of the first contact glass 11. The document reference plate is a plate indicating indexes are marked for sizes and placing directions of documents each of which is to be placed on the first contact glass 11. A user can easily place each document on the first contact glass 11 in accordance with a corresponding index.

The second contact glass 16 has a smaller area than the first contact glass 11. The second contact glass 16 is arranged (i) so as to be located on a home position side (described later) of the first and second scanning units 12 and 13 and (ii) so as to be adjacent to the first contact glass 11 in a direction in which the first and second scanning units 12 and 13 move.

The first reading section 10 has (i) a function of reading a document placed on the first contact glass 11 and (ii) a function of reading an image of a document (document image) which is carried by members of the upper housing 2b (described later).

The upper housing 2b includes a document carrying section 31, a second reading section 23, and a document discharging section 34.

The document carrying section 31 includes a document feeder tray 22 formed on an upper surface of the upper housing 2b. The document carrying section 31 takes in documents, one by one, placed on the document feeder tray 22, and carries the documents one by one through a document conveying path 33 (described later).

There are provided, around the document conveying path 33, an assistant feeding roller 61, a detection sensor 62 for detecting a document, a document pressing board 63, a friction pad 64, a feeding timing sensor 65, a feeding roller 66, and a pair of alignment rollers 67.

The assistant feeding roller 61 and the document pressing board 63 cause documents detected by the detection sensor 62 to be conveyed, sheet by sheet, inside the upper housing 2b. The friction pad 64, the feeding roller 66, and the pair of alignment rollers 67 cause the conveyed documents to be directed, sheet by sheet, toward the second reading section 23 on the basis of a result detected by the feeding timing sensor 65.

Note that a drive shaft of the alignment rollers 67 includes an electromagnetic clutch (not illustrated) so as to control communication of a drive force from a drive motor (not illustrated). When no document is detected by the detection sensor 62, the pair of alignment rollers 67 are stopped. When (i) a leading end of a document sheet is brought into contact with the feeding timing sensor 65 and then (ii) the feeding timing sensor 65 sends a predetermined signal to the pair of alignment rollers 67, the pair of alignment rollers 67 are rotated in a direction in which a document sheet is carried downstream.

The document sheet is carried from upstream by the friction pad 64 and the feeding roller 66, and the leading end of the document sheet runs into a nip area of the pair of alignment rollers 67 which are stopped. This causes the document sheet to have a predetermined bent. Note that the nip area of the alignment rollers 67 causes the leading end of the document sheet to be aligned so that the leading end is orthogonal to the direction in which the document sheet is carried. After that, the pair of alignment rollers 67 are rotated so as to carry the document sheet downstream. The pair of alignment rollers 67 and the second contact glass 16 constitute a part of the document conveying path 33.

The second reading section 23 is provided for reading, from above, the image of the document which has been placed on the document feeder tray 22 and has been carried through the document conveying path 33. The image formed on an upper surface of a document sheet is read by the second reading section 23. The second reading section 23 in Embodiment 1 is made up of a CIS (contact image sensor).

The document discharging section 34 is provided for discharging, to the outside, the document sheet whose image has been read by the second reading section 23. The document discharging section 34 includes a pair of document discharging rollers 69 and a document discharging sensor 59.

An upper roller of the pair of document discharging rollers 69 is a driving roller, and a lower roller is a driven roller. The upper roller is integrally provided in an appropriate location of the upper housing 2b, and can be driven by a driving mechanism (not illustrated) included in the upper housing 2b. The upper roller and the lower roller which is rotatably provided on the lower housing 2a side carry the document sheet which has been carried through the document conveying path 33 while nipping the document sheet. Then the upper and lower rollers discharge the document onto the paper output tray 20 provided, in place, on a side surface of the lower housing 2a.

The document discharging sensor 59 is provided, in place, downstream of the pair of document discharging rollers 69, and informs the control section 8 that the document has been discharged.

The following description will discuss a reading operation in the image input section 2. The image input section 2 has the following modes for reading an image of a document sheet: a static-sheet reading mode in which an image of a document sheet is read in a stationary state; a sheet-feeding one-side reading mode in which an image of one side of a document sheet is read while the document sheet is being carried; and a sheet-feeding both-side reading mode in which images of both sides of a document sheet are read while the document sheet is being carried.

First, a reading operation in the static-sheet reading mode will be described. When a document sheet is placed on the first contact glass 11, a size of the document sheet is detected by a document size sensor (e.g., photosensor) provided in the lower housing 2a or in a vicinity of the first contact glass 11.

Upon reception of an instruction on the reading operation, the reading operation of the document sheet is carried out in the static-sheet reading mode. Note that, before the reading operation, the first scanning unit 12 is in a home position which is set between a location indicated by the arrow L1 and a location, indicated by the arrow L3 (described later), which is closer to the paper output tray 20 than the arrow L1 is.

Upon reception of the instruction on the reading operation, the first scanning unit 12 moves from the home position to the location (starting position) indicated by the arrow L1. After that, the first scanning unit 12 moves in a direction from the starting position toward a location indicated by the arrow L2, by a predetermined distance which varies in accordance with a size of the document sheet detected by a document size detection sensor (not illustrated). Note that the second scanning unit 13 moves in conjunction with the first scanning unit 12.

This allows the CCD 15 to receive reflection light in accordance with the image of the document sheet, and ultimately allows the first reading section 10 to read the image formed on a lower surface (top side) of the document sheet which is stationary on the first contact glass 11.

A reading operation in a sheet-feeding reading mode will be described below. When the first scanning unit 12 carries out the reading operation in the sheet-feeding reading mode, i.e., when a document sheet is placed on the document feeder tray 22, the first scanning unit 12 moves from the home position to the location indicated by the arrow L3 of FIG. 2. The second contact glass 16 is provided so as to face the first scanning unit 12 which is in the location indicated by the arrow L3. Note that it is possible to select, in the sheet-feeding reading mode, one of the sheet-feeding one-side reading mode and the sheet-feeding both-side reading mode, and a user can select one of them from the operating section 7.

In a case where the sheet-feeding one-side reading mode is selected, the control section 8 controls only the first reading section 10 to read an image of the document sheet to be carried. In this case, the first scanning unit 12 of the first reading section 10 causes the document sheet, which is being carried, to be exposed to light, while the first scanning unit 12 is stationary in the location indicated by the arrow L3. Then, the CCD 15 reads, from underneath through the second contact glass 16, the image of the document sheet which is being carried through the document conveying path 33. The first reading section 10 reads the image formed on the lower surface of the document sheet.

On the contrary, in a case where the sheet-feeding both-side reading mode is selected, the first reading section 10 and the second reading section 23 simultaneously read images of the document sheet. Specifically, the control section 8 controls the first scanning unit 12 of the first reading section 10 to read, from the underneath, the images of the document sheet which is being carried through the document conveying path 33 while the first scanning unit 12 is stationary in the location indicated by the arrow L3. Meanwhile, the second reading section 23 reads, from the above, the image formed on an upper surface (back side) of the document sheet which is being carried.

In the sheet-feeding both-side reading mode, the images of the both surfaces (top side and back side) of the document sheet, which is being carried, are read at once by the first reading section 10 from the underneath and by the second reading section 23 from the above.

Going back to FIG. 1, the image processing section 3 includes an A/D (analog/digital) conversion section 101, a shading correction section 102, an input tone correction section 103, an document type determining section 104, a segmentation process section 105, a color correction section 106, a black generation and under color removal section 107, a spatial filter process section 108, an output tone correction section 109, and a tone reproduction processing section (halftone dot generation section) 110.

Image data (input image data) obtained by causing the image input section 2 to read an image of a document is subjected to operations of the A/D conversion section 101, the shading correction section 102, the input tone correction section 103, the document type determining section 104, the segmentation process section 105, the color correction section 106, the black generation and under color removal section 107, the spatial filter process section 108, the output tone correction section 109, and the tone reproduction processing section 110 in this order.

Then, the image data indicated by digital color signals of CMYK (C: cyan, M: magenta, Y: yellow, K: black) is outputted from the image processing section 3 (tone reproduction processing section 110) to the image output section 4.

Specifically, the A/D conversion section 101 is provided for carrying out an A/D conversion process. In the A/D conversion process, analog RGB signals serving as the image data of colors obtained from the image input section 2 are converted into, for example, 10-bit digital signals. The A/D conversion section 101 outputs, to the shading correction section 102, digital RGB signals (hereinafter, merely referred to as RGB signals) which have been subjected to the A/D conversion process.

The shading correction section 102 is provided for carrying out a shading correction process. In the shading correction process, various kinds of distortion which could be generated in an illumination system, an image focusing system, or an image sensing system of the image input section 2 are eliminated from the image data made up of the RGB signals supplied from the A/D conversion section 101. The shading correction section 102 supplies the RGB signals, which have been subjected to the shading correction process, to the input tone correction section 103.

The input tone correction section 103 carries out (A) a process for adjusting a color balance and (B) a γ correction process with respect to the RGB signals supplied from the shading correction section 102. The input tone correction section 103 supplies the RGB signals, which have been subjected to the processes, to the document type determining section 104.

The document type determining section 104 carries out a document type determining process. The document type determining process determines a type of a document read by the image input section 2 on the basis of the RGB signals whose color balance etc. have been adjusted by the input tone correction section 103. Examples of the type of the document include a text document, a printed-picture document, and a text/printed-picture document in which a text and a printed-picture both exist. The document type determining section 104 further carries out an automatic color selection (ACS) process on the basis of the RGB signals supplied from the input tone correction section 103. In the automatic color selection process, it is determined whether a read document is a color document (document having a color image) or a black-and-white document (document having a monochrome image). The document type determining section 104 can further carry out a blank page detecting process in which it is determined whether or not the read document is a blank document (blank page document, or document with no image). Note that the RGB image data of the document type determining section 104 is supplied to the segmentation process section 105.

Examples of a method for determining a document type in the document type determining section 104 include the following method, including the steps (1) through (7) (disclosed in Patent Document 2), which is proposed by one of the applicants of the present invention. Note that each of the text document, the text/printed-picture (halftone photograph) document, and the text/photograph (continuous tone photograph) includes a text.

(1) Calculated are a minimum density (pixel value) and a maximum density of a block made up of n×m (e.g., 7×15) pixels including each target pixel of pixels of an image obtained by a reading operation.

(2) A maximum density difference is calculated for each block. The maximum density difference is defined by a difference between a read minimum density and a read maximum density.

(3) Calculated is a total density busyness which is a total sum of absolute values of differences in densities between any adjacent two pixels (e.g., a total sum of absolute values calculated in a main scanning direction and absolute values calculated in a sub scanning direction).

(4) A calculated maximum density difference and a maximum density difference threshold are compared with each other, and a calculated total density busyness and a total density busyness threshold are compared with each other. It is determined that the target pixel belongs to a page background/photograph region in a case where the following conditions (A) and (B) are met: (A) the maximum density difference<the maximum density difference threshold and (B) the total density busyness<the total density busyness threshold. Otherwise, it is determined that the target pixel belongs to a text/halftone dot region.

(5) It is determined that the target pixel is a page background pixel in a case where (i) it is determined that the target pixel belongs to the page background/photograph region and (ii) the following condition (C) is met: (C) the maximum density difference a page background/photograph determining threshold. Otherwise, it is determined that the target pixel is a photograph (photograph region, continuous tone image region) pixel.

(6) It is determined that the target pixel is a text pixel, in a case where (i) it is determined that the target pixel belongs to the text/halftone dot region and (ii) the following condition (D) is met: (D) the total density busyness<(the maximum density difference X a text/halftone dot determining threshold). Otherwise, it is determined that the target pixel is a halftone dot pixel.

(7) The type of the whole document is determined by comparing the number of counted pixels categorized to each of the page background region, the photograph region, the text region, and the halftone dot region with a corresponding one of predetermined thresholds of the page background region, the photograph region, the halftone dot region, and the text region.

For example, it is assumed that a text region has the highest detection accuracy, a halftone dot region has the second-highest detection accuracy, and a photograph region has the lowest detection accuracy. In a case where a rate of the text region is 30% or more of the whole number of pixels, the document is determined to be a text document, whereas, in a case where a rate of the halftone dot region is 20% or more of the whole number of pixels, the document is determined to be a halftone dot document (printed-picture document). Meanwhile, in a case where a rate of the photograph region is 10% or more of the whole number of pixels, the document is determined to be a photograph document.

Further, in a case where the rate of the text region and the rate of the halftone dot region are equal to or larger than their respective thresholds, the document type determining section 104 determines that the document is a text/halftone dot document (text/printed-picture document).

(8) Furthermore, simultaneously with carrying out the foregoing process, the document type determining section 104 determines whether the target pixel is a chromatic color or an achromatic color.

The determination (8) will not be described in detail, however, can be achieved by employing, for example, the following method (A) or (B).

(A) A method in which a difference (i.e., max (R, G, B)-min (R, G, B)) between a maximum value of RGB signals (max (R, G, B)) and a minimum value of RGB signals (min (R, G, B)) is compared with a threshold THa.

$$\max(R,G,B) - \min(R,G,B) \geq THa \text{ (e.g., } THa=20\text{)}$$

(B) A method in which an absolute value of a difference between respective color components of RGB signals is calculated and each absolute value is compared with a corresponding threshold.

(9) The document type determining section 104 counts the number of pixels which have been determined, in the step (7), (i) to be a printed-picture document or a text/printed-picture document and (ii) to be achromatic color halftone dots. As a result, in a case where the number of such pixels is equal to or larger than a threshold THb, the document type determining section 104 determines whether the printed-picture document or the text/printed-picture document is a document including achromatic color halftone dots.

Note that it is important that the document type can be determined. For example, it is possible to determine the document type based only on selected pixels by which segmentation can be surely carried out, without taking into consideration pixels having features near a threshold.

A document type determination signal indicative of the document type which has been determined by the document type determining section 104 is supplied to the color correction section 106, the black generation and under color removal section 107, the spatial filter process section 108, the output tone correction section 109, and the tone reproduction processing section 110.

The segmentation process section 105 carries out a segmentation process in which it is determined what kind of region pixel of image data made up of RGB signals belongs to. Examples of image regions determined by the segmentation process section 105 include a page background region, a photograph region (continuous tone image region), a black text region, a color text region, and a halftone dot region. Note that it is possible to employ, as a method of determining an image region, a determination method employing, for example, the steps (1) through (6) out of the steps (1) through (9) which are carried out by the document type determining section 104.

The segmentation process section 105 further determines (A) whether a pixel is a chromatic color or an achromatic color and (B) whether or not a halftone dot is an achromatic color. It is possible to employ, as a method of determining the foregoing (A) and (B), a determination method that employs the step (8) which is carried out by the document type determining section 104. Note that the segmentation process section 105 can determine whether a pixel is a black text or a color text on the basis of a result determined in the step (A). For example, the segmentation process section 105 carries out the segmentation based on the determination result of the document type, by using, as a threshold for use in the segmentation process (in the process, which region each of the pixels belongs to is determined), a threshold which is different from that used in the document type determining section 104. This makes it possible to improve determination accuracy of a region.

The segmentation process section 105 supplies a segmentation class signal, indicative of (i) which region each of the pixels belongs to and (ii) whether each of the pixels is a chromatic color or an achromatic color, to the color correction section 106, the black generation and under color removal section 107, the spatial filter process section 108, the output tone correction section 109, and the tone reproduction processing section 110. Note that, in the segmentation process, a type of an image region can be determined for each block which is made up of a plurality of pixels, instead of for each pixel.

The color correction section 106 converts RGB signals, which are supplied from the segmentation process section 105, into CMY signals, which CMY (C: cyan, M: magenta, Y: yellow) are complementary colors of RGB, respectively, in accordance with a type of a region indicated by the segmentation class signal outputted from the segmentation process section 105. The color correction section 106 further carries out a color conversion in accordance with the document type indicated by the document type determination signal to be supplied from the document type determining section 104. The color correction section 106 further carries out a color correction (improvement in color reproduction) in accordance with a characteristic of the image output section 4.

The black generation and under color removal section 107 generates a K (black) signal based on the CMY signals received from the color correction section 106, and generates CMYK signals including the generated K signal. The black generation and under color removal section 107 supplies the generated CMYK signals to the spatial filter processing section 108. For example, in a case where black is generated with the use of skeleton black, the black generation and under color removal section 107 carries out the following processing. A black generation and under color removal process is expressed by the following expressions (1) through (4), where an input/output characteristic of the skeleton black is $y=f(x)$, data to be inputted is C, M, and Y, data to be outputted is C', M', Y', and K', and a UCR (under color removal) rate is a ($0<\alpha<1$).

$$K'=f\{\min(C,M,Y)\} \quad (1)$$

$$C'=C-\alpha K' \quad (2)$$

$$M'=M-\alpha K' \quad (3)$$

$$Y'=Y-\alpha K' \quad (4)$$

The spatial filter process section 108 is provided for carrying out a spatial filter process. In the spatial filter process, a correction of a spatial frequency characteristic of an image is carried out with respect to the CMYK signals supplied from the black generation and under color removal section 107, with the use of a digital filter which has been set for each region in advance, in accordance with the type of a region. The type of the region is indicated by the segmentation class signal which is (i) supplied from the segmentation process section 105 and (ii) synchronized with the CMYK signals.

The spatial filter process section 108 carries out, as the spatial filter process, an edge enhancement process for preventing a blur of an output image and a smoothing process for preventing deterioration of graininess. The spatial filter process section 108 supplies the corrected CMYK signals to the output tone correction section 109.

In accordance with the type of the region indicated by the segmentation class signal which (i) has been supplied from the segmentation process section 105 and (ii) is synchronized with the CMYK signals, the output tone correction section 109 carries out an output tone correction process (tone correction process), so as to be in conformity with the characteristic of the image output section 4, with respect to the CMYK signals supplied from the spatial filter process section 108. The output tone correction section 109 supplies the processed CMYK signals to the tone reproduction processing section 110.

The tone reproduction processing section 110 carries out a tone reproduction process with respect to the CMYK signals supplied from the output tone correction section 109. In Embodiment 1, a different multi-level dithering process is carried out, as the tone reproduction process, depending on the type of the region indicated by the segmentation class signal which (i) has been supplied from the segmentation process section 105 and (ii) is synchronized with the CMYK signals. A "different dithering process" indicates a dithering process in which a different threshold is used depending on the type of the region. The multi-level dithering process will be described later.

The tone reproduction processing section 110 supplies the processed CMYK signals to a RAM (not illustrated) in the storage section 5 and/or a RAM (not illustrated) in the control section 8. The storage section 5 etc. store received CMYK signals, and supplies the received CMYK signals to the image output section 4 in accordance with an instruction on image formation (described later) transmitted by the control section 8.

The image output section 4 functions as image forming means, and outputs image data, as an image, onto a recording medium (e.g., a sheet medium such as paper). The image output section 4 can form the image on the recording medium with the use of developers of two or more colors. Note that, in Embodiment 1, the image is formed on the recording medium with the use of developers of colors C, M, Y, and K.

Specifically, the image output section 4 forms an image by forming (i) an image corresponding to image data of "C" with the use of a developer of color "C," (ii) an image corresponding to image data of "M" with the use of a developer of color "M," (iii) an image corresponding to image data of "Y" with the use of a developer of color "Y," and (iv) an image corresponding to image data of "K" with the use of a developer of color "K."

Note that, in Embodiment 1, the image output section 4 is realized by a printer employing an electrophotographic printing method, however, Embodiment 1 is not limited to this. Alternatively, the image output section 4 can be realized by a printer employing an ink-jet method. Also note that the image output section 4 is not limited to a printer, and can therefore be a CRT display apparatus or a liquid crystal display apparatus. In this case, received CMYK signals are converted into RGB signals so that the CRT display apparatus or the liquid crystal display apparatus can carry out the processing. Alternatively, the image output section 4 can be configured so as to (i) transmit image data via a facsimile or (ii) transmit (imagetransmits) image data to another external communication apparatus such as an image forming apparatus or a personal computer.

The transmitting/receiving section 6 will not be described in detail. The transmitting/receiving section 6 is provided for transmitting/receiving various kinds of data, such as image data, to/from another external communication apparatus such as an image forming apparatus, a personal computer, or a facsimile.

The operating section 7 includes (i) a display section such as a liquid crystal display and (ii) an operation key such as a numerical keypad. Information entered from the operating section 7 is supplied to the control section 8. Note that it is possible to enter the reading mode from the operating section 7. That is, it is possible to select, from the operating section 7, one of the sheet-feeding one-side reading mode and the sheet-feeding both-side reading mode. It is also possible to select, from the operating section 7, (i) an automatic discrimination mode in which a document type, such as photograph document, text/photograph document, text document, printed-picture document, or text/printed-picture document, is automatically discriminated in the image forming apparatus 1 or (ii) a manual specifying (selecting) mode in which the document type is manually specified. It is further possible to enter, from the operating section 7, an instruction on enabling a line noise suppression mode (described later).

The control section 8 controls each section of the image forming apparatus 1. Specifically, the control section 8 includes (i) a CPU (central processing unit) or a DSP (digital signal processor) and (ii) an internal storage section (not illustrated) in which a control program which is executed by the CPU or the like is stored. By causing the CPU or the like to execute the control program, the control section 8 controls each section in the image forming apparatus 1 to carry out a corresponding process.

(Tone Reproduction Processing Section)

The following description will discuss the dithering process carried out by the tone reproduction processing section 110. It is possible to employ, as the dithering process, for example a method disclosed in Patent Document 3 which has been proposed by the applicant of the present application. Note that image data is constituted by density values of respective C, M, Y, and K colors, however, the dithering process carries out a similar process irrespective of the color components of the image data. Accordingly, the following description will discuss only a process with respect to a density value (pixel value) of one color component, and the description of processes with respect to other colors will be omitted.

Figure 3:
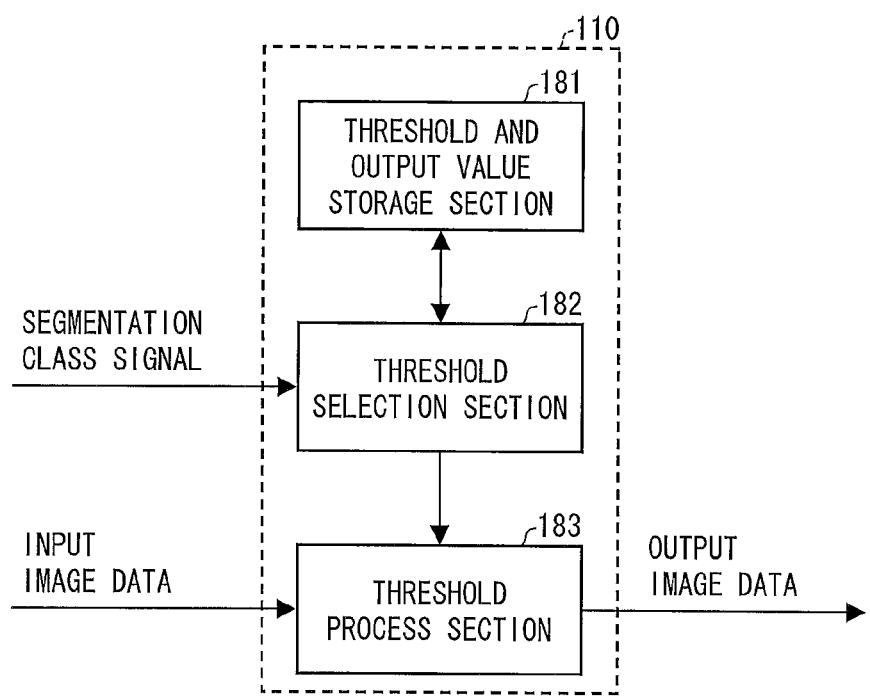
FIG. 3 is a block diagram illustrating a configuration of a tone reproduction processing section included in the image forming apparatus.

FIG. 3 is a block diagram illustrating an example arrangement of main parts of the tone reproduction processing section 110. The tone reproduction processing section 110 includes a threshold process section 183, a threshold selection section 182, and a threshold and output value storage section 181. The threshold and output value storage section 181 stores fifteen (15) thresholds and sixteen (16) output values in each pixel location of a dither matrix for use in the dithering process. Note that the thresholds and the output values are separately stored for respective segmentation results (e.g., an edge region (e.g., text region) and regions other than the edge region (e.g., a halftone dot region, a photograph region, and page background region)). The threshold selection section 182 selects, in response to a supplied segmentation class signal, (i) a threshold and an output value each for the edge region or (ii) a threshold and an output value each for the regions other than the edge region, and reads out the threshold and the output value selected from the threshold and output value storage section 181. The read out threshold etc. are transmitted to the threshold process section 183.

The threshold process section 183 carries out a comparison between pixels of input image data and respective thresholds (e.g., fifteen (15) thresholds) for locations to which respective high-density output values (pixel values) in the dither matrix are sequentially allotted. Note that the thresholds (e.g., fifteen (15) thresholds) are selected in accordance with the segmentation class signal. Based on the comparisons, the threshold process section 183 outputs one of output values (e.g., sixteen (16) output values). Embodiment 1 employs a multi-level dithering process in which output image data (output value) having 16 values (0 through 15) is outputted for input image data (input density value) of 0 through 255. FIG. 4 illustrates an example correspondence relationship between the input density (density value of pixel), the thresholds, and the output values.

As illustrated in FIG. 4, one of output values Out[j] (j=0, 1, 2, . . . , 15 (Out[j] Out[j+1])) is outputted in accordance with a comparison of magnitudes (comparison result) between (i) thresholds Th[i][j] (j=0, 1, 2, . . . , 14 (Th[i][j]≤Th[i][j+1])) which are prepared for respective locations i (i=0, 1, 2, . . . , n) in the dither matrix and (ii) input density values x. Note that the thresholds are set so that a part of the dither matrix is subjected to a different dithering process in accordance with a region discrimination result, whereas other parts of the dither matrix are subjected to identical dithering processes irrespective of the region discrimination result.

Figure 6:
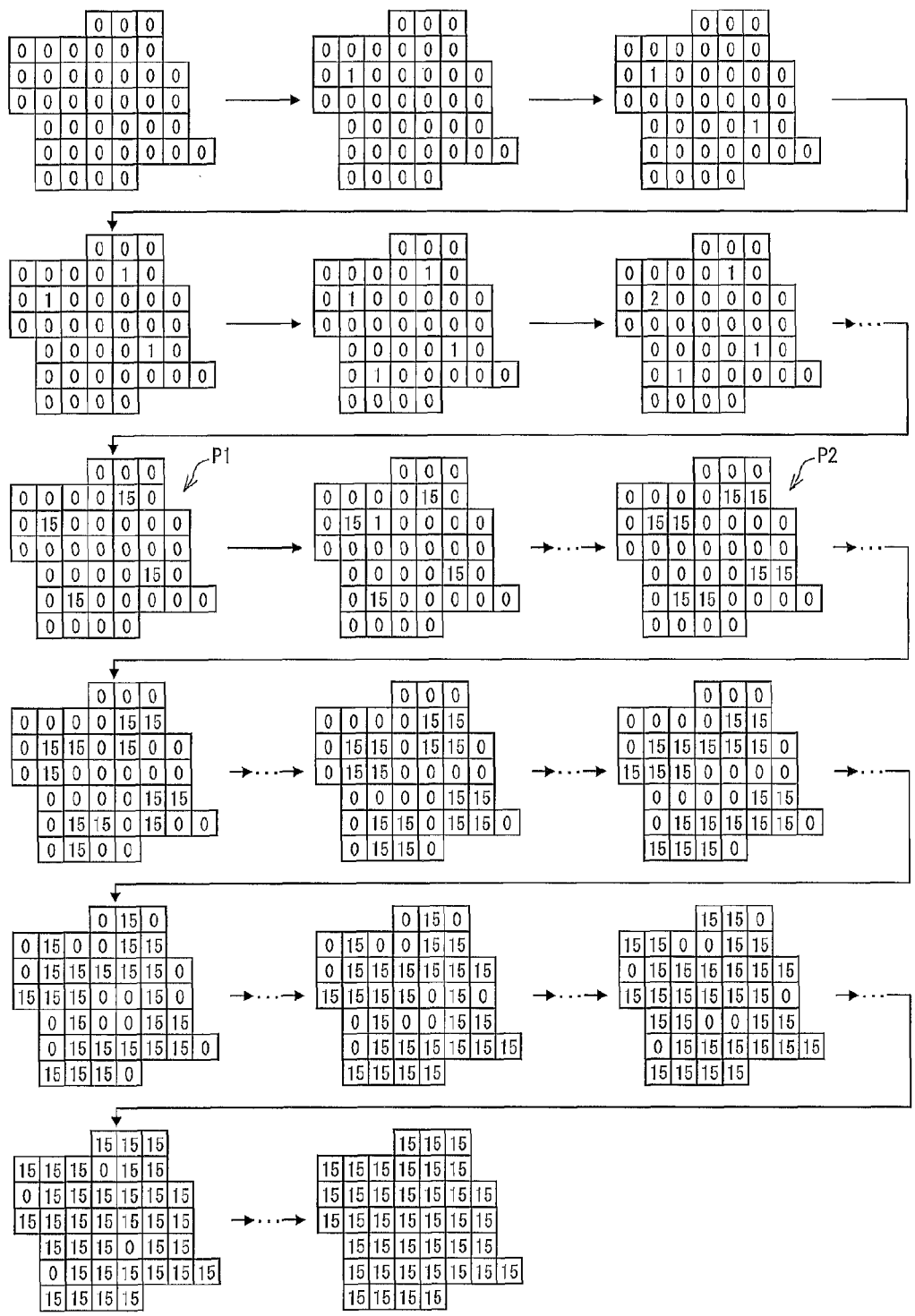
FIG. 6 is a view illustrating an example how an output value in each cell is changed in a tone reproduction process of a tone reproduction processing section.
Figure 7:
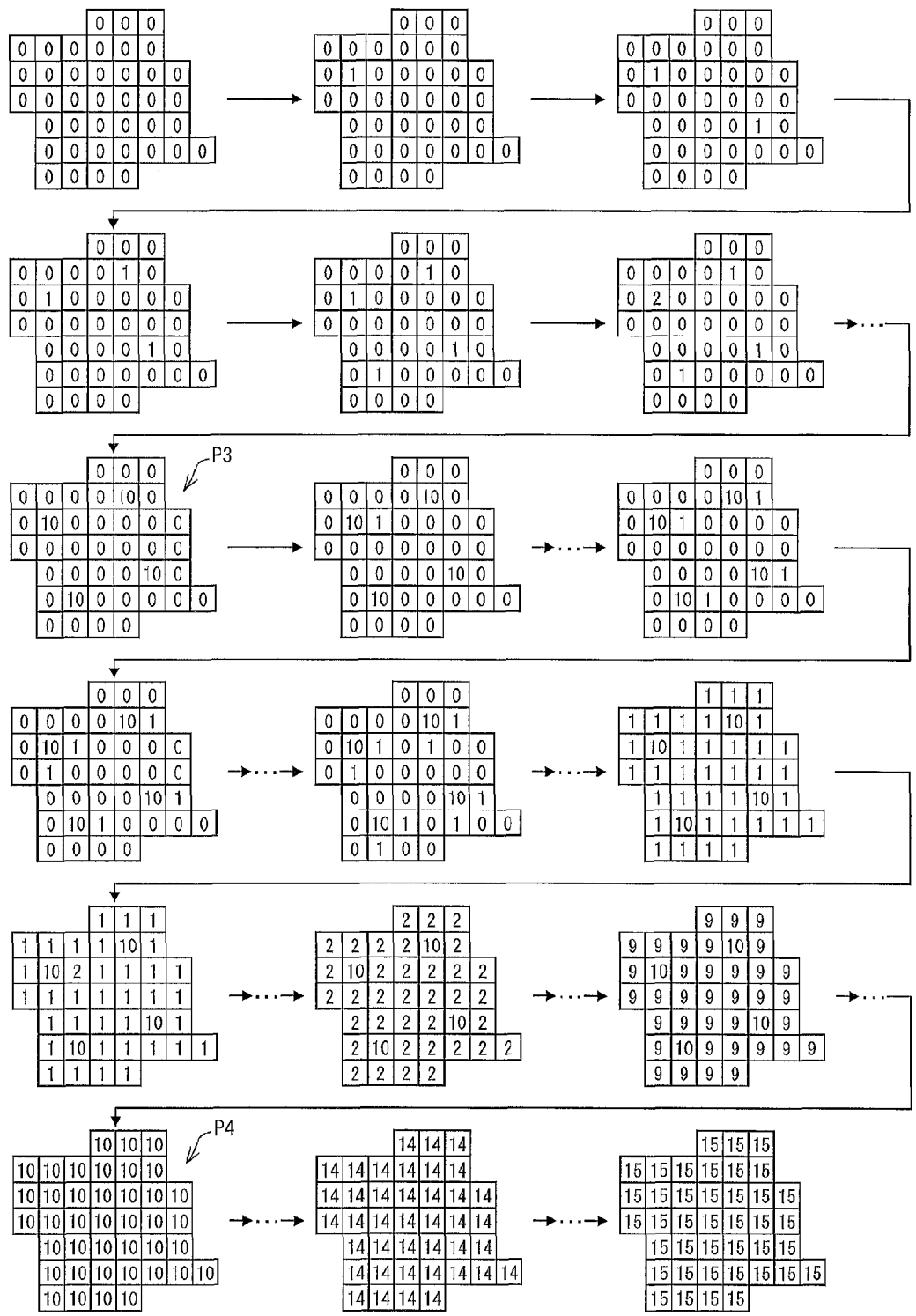
FIG. 7 is a view illustrating another example how an output value in each cell is changed in a tone reproduction process of a tone reproduction processing section.

FIG. 5 is a view illustrating an example dither matrix for use in a multi-level dithering process. FIG. 6 and FIG. 7 are view each illustrating an example output value of a low density value to a high density value. A dither matrix M of FIG. 5 is made up of a plurality of sub-matrixes (e.g., four sub-matrixes) (in FIG. 5, a first sub-matrix through a fourth sub-matrix). Numerical numbers of the cells (hereinafter, referred to as "numbers") indicate that output values (density values) to be allotted to the cells are higher as the numbers (numerical values) of the cells are smaller (a highest output value is allotted to a cell whose number is "0"), and numerical numbers of respective cells shown in each of FIG. 6 and FIG. 7 indicate output values.

In a case where the multi-level dithering process is carried out with respect to the regions other than the edge region with the use of the dither matrix M of FIG. 5, for example, the following inequalities of thresholds to be satisfied. This causes output values in each sub-matrix to be increased from 1 to 15, in accordance with a numerical order from low density (upper left side of FIG. 6) to high density (lower right side of FIG. 6):

$$Th[i][j] \le Th[i+1][j]$$

$$Th[4k+3][j] \le Th[4k][j+1]$$

$$Th[4k+3][14] \le Th[4k+4][0]$$

(k=0,1,2, . . . ,8).

For example, as illustrated in FIG. 6, output values of cells having numbers "0", "1", "2", and "3" which are starting points (cores) of the respective sub-matrixes are increased from 1 to 15. The dither matrix in which the output values of the cells "0", "1", "2", and "3" are all increased to 15 is a dither matrix indicated by the arrow P1. After that, output values of cells having numbers "4", "5", "6", and "7" are increased from 1 to 15. The dither matrix in which the output values of the cells "4", "5", "6", and "7" are all increased to 15 is a dither matrix indicated by the arrow P2. Then, the output values of the cells having numbers "8", "9", "10", and "11" are increased from 1 to 15. Similarly, other output values of the respective cells are changed, by causing output values of the cells in the respective sub-matrixes to be increased from 1 to 15, which cells are located in the locations of the respective sub-matrixes.

In a case where the multi-level dithering process is carried out with respect to the edge region with the use of the dither matrix M of FIG. 5, for example, the following inequalities of thresholds to be satisfied. This causes output values of numerical numbers (cores) "0", "1", "2", and "3" in each sub-matrix to be increased from 1 to 10, in accordance with a numerical order from low density (upper left side of FIG. 7) to high density (lower right side of FIG. 7):

$$Th[i][j] \leq Th[i+1][j]$$

$$Th[3][j1] \leq Th[0][j1+1]$$

$$Th[3][9] \leq Th[4][0]$$

$$Th[39][j1] \leq Th[4][j1+1]$$

$$Th[39][j2] \leq Th[0][j2+1]$$

$$(j1=0,1,2,\ldots,8, \text{ and } j2=9,10,\ldots,13)$$

Output values of other cells are uniformly increased to 10 in accordance with the numerical order. As a result, the output values of all cells are uniformly increased to 10.

For example, the output values of the cells having numbers "0", "1", "2", and "3" which are starting points (cores) of the respective sub-matrixes are increased from 1 to 10. The dither matrix in which output values of the cells "0", "1", "2", and "3" are increased to 10 is a dither matrix indicated by the arrow P3. After that, the output values of cells having numbers "4" through "39" are increased to 1 in a numerical order, and then are increased to 2 in the numerical order. In this way, the output values of cells having numbers "4" through "39" are incremented by one up to the output value of 10. The dither matrix in which output values of the cells of the numbers "4" through "39" are all increased to 10 is a dither matrix indicated by the arrow P4. Then, the output values of the cells having numbers "0" through "39" are uniformly increased to 15 in the numerical order.

In this case, high-density unevenness becomes larger, whereas jaggy becomes less visible as compared with the multi-level dithering process (in which output values are increased from 1 to 15) for the regions other than the edge region. Note, however, that since the edge region is not continuous over a wide range, the unevenness does not affect so much. Furthermore, in the multi-level dithering process for the edge region, output values of 4 pixels out of forty (40) pixels in the dither matrix M, i.e., an output value of one pixel out of ten (10) pixels in a sub-matrix (numbers "0", "1", "2", and "3" which are the cores of the dither matrix M) is converted into an output value identical, up to the output value of 10, to the output value converted in the multi-level dithering process for the regions other than the edge region. This causes switching, between the multi-level dithering process for the edge region and the multi-level dithering process for the regions other than the edge region, to be less visible.

Note that, in Embodiment 1, the output values Out[j] (j=0, 1, 2, . . . , 15, (Out[j] Out[j+1])) are set to integers 0 to 15 each expressed by 4 bits. Embodiment 1 is, however, not limited to this. Alternatively, it is possible to set the output values to 16 integers selected from integers 0 to 255 expressed by 8 bits on the basis of the characteristic of the image output section 4.

The description has discussed the case where the dither matrix is made up of the four sub-matrixes as illustrated in FIG. 5. Embodiment 1 is, however, not limited to this. Therefore, the number of sub-matrixes provided in the dither matrix can be arbitrarily set. Alternatively, for example, it is possible to use a single sub-matrix of FIG. 5 as the dither matrix, instead of using a plurality of sub-matrixes.

FIG. 8 is a view illustrating another example of the dither matrix for use in the multi-level dithering process. A dither matrix M' illustrated in FIG. 8 is made up of two sub-matrixes (first and second sub-matrixes) out of the four sub-matrixes of the dither matrix M illustrated in FIG. 5. Numerical values of respective cells, of which the dither matrix M' is made up, indicate that density values to be allotted to the cells are higher as the numerical values of the cells are smaller (a highest output value is allotted to a cell whose number is "0").

Figure 9:
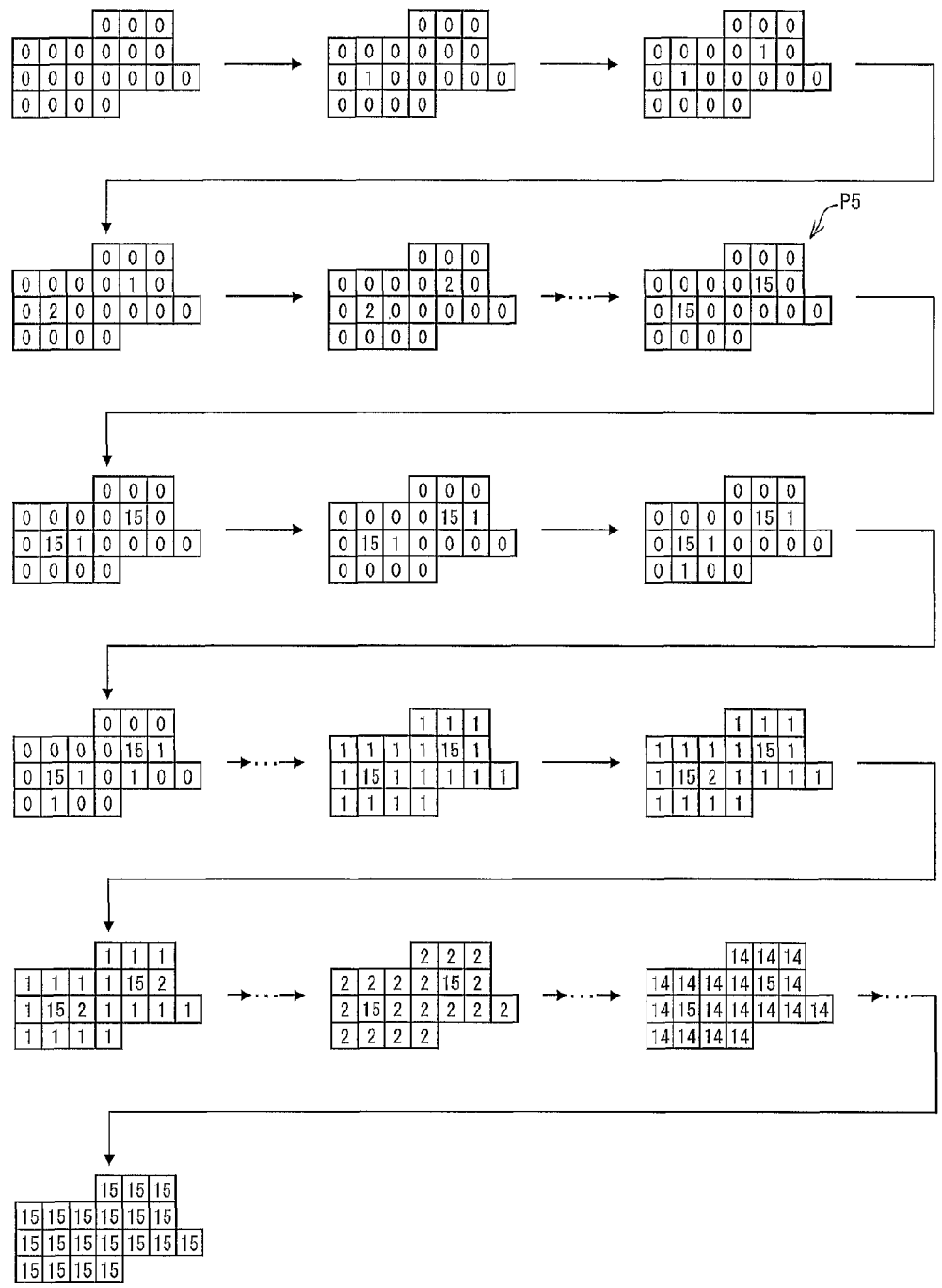
FIG. 9 is a view illustrating an embodiment in which output values of respective cells are changed in a case where (i) a dither matrix illustrated in FIG. 8 is used and (ii) a density value of image data is increased from "0" to "255".

Alternatively, it is possible to change, as illustrated in FIG. 9, output values of respective cells, in a case where (i) thresholds of the respective cells, of which the dither matrix M' are made up, are set similarly to those described above and (ii) the density value of the image data is increased from "0" to "255". In FIG. 9, output values of cells having numbers "0" and "1" which are starting points (cores) of the respective sub-matrixes are alternately incremented by one up to the output value of 15. The dither matrix in which output values of the cells having numbers "0" and "1" are increased to 15 is a dither matrix indicated by the arrow P5. After that, output values of cells having numbers "4" through "19" are cyclically incremented by one up to the output value of 15. As described above, the output values for the respective cells are changed.

Alternately, different dither matrixes (for example, the dither matrix of FIG. 5 and the dither matrix of FIG. 8) are prepared in advance, and a dither matrix to be used can be changed in accordance with the type of region indicated by a segmentation class signal. For example, output illustrated in FIG. 6 is carried out with respect to the regions other than edge region with the use of the dither matrix of FIG. 5, whereas output illustrated in FIG. 9 is carried out with respect to the edge region with the use of the dither matrix of FIG. 8.

By taking into consideration the fact that tone of the edge region is less important than that of the regions other than the edge region, it is possible to use a dither matrix having a smaller number of sub-matrixes for the edge region. Note that a memory capacity of the threshold and output value storage section 181 becomes smaller as the number of submatrixes are reduced. This is an advantage in terms of miniaturization and cost reduction.

(Line Noise Reduction Process)

As illustrated in FIG. 1, the image forming apparatus 1 of Embodiment 1 includes the control section 8 including a mode setting section 81 for enabling a line noise suppression mode in which a line noise image, which does not exist in a document image for input image data but exists in the input image data, is suppressed. The description, as to in which case the mode setting section 81 enables the line noise suppression mode, will be discussed later. Note that the image processing apparatus in accordance with Embodiment 1 includes the spatial filter process section 108, the output tone correction section 109, and the mode setting section 81.

According to Embodiment 1, in a case where the line noise suppression mode is enabled by the mode setting section 81, the spatial filter process section 108 and the output tone correction section 109 carry out the following processing (described later). This makes it possible to (i) eliminate a line noise image which does not exist in a document image for input image data but exists in the input image data or (ii) make the line noise image as less visible as possible. The line noise image is caused by (a) a foreign matter, such as dust and/or paper dust from paper, which is adhered to the top surface of the scanner platen and/or (b) a scratch on the scanner platen.

The following description will discuss in detail processing of the spatial filter process section 108 and the output tone correction section 109. Hereinafter, the eliminating of a line noise image or making the line noise image as less visible as possible is referred to as "reduction in line noise".

FIGS. 11 (a) through 11 (c) are views illustrating example filter coefficients for use in a process carried out by the spatial filter process section 108. Specifically, FIG. 11 (a) is a view illustrating an example filter coefficient for enhancing an edge of a text region so that a text or a thin line is clearly reproduced. FIG. 11 (b) is a view illustrating an example filter coefficient for use in a smoothing process, and FIG. 11 (c) is a view illustrating an example filter coefficient which outputs an input value without any modification.

In a case where the line noise suppression mode is disabled (i.e., in a case where there is no need to reduce line noise) with respect to pixels of a text region (discriminated by the segmentation process section 105), the spatial filter process section 108 carries out a spatial filter process with the use of, for example, the filter coefficient illustrated in FIG. 11 (a). This process makes is possible to enhance an edge of a text or a thin line so that the text or the thin line is clearly reproduced.

Meanwhile, in a case where the line noise suppression mode is enabled (i.e., in a case where it is necessary to reduce line noise) in Embodiment 1, (i) a text region is smoothed by carrying out the spatial filter process with respect to pixels of the text region, which has been discriminated by the segmentation process section 105, with the use of, for example, the filter coefficient illustrated in FIG. 11 (b) or (ii) an input value is outputted without any modification with the use of, for example, the filter coefficient illustrated in FIG. 11 (c). In a case where the line noise suppression mode is enabled, a spatial filter process in which an edge enhancement degree of an image (edge enhancement degree) is smaller than that obtained when the line noise suppression mode is disabled (when the filter coefficient illustrated in FIG. 11 (a)), is carried out by using, for example, the filter coefficient illustrated in FIG. 11 (b) or FIG. 11 (c).

A reason why a filter coefficient to be used is changed depending on whether or not the line noise suppression mode is enabled is as follows. It is supposed that pixels determined to be a text region include (i) first pixels corresponding to a thin line indicative of line noise and (ii) second pixels corresponding to a text existing in the document. Generally, a text existing in a document is thicker than line noise.

The first pixels differ from the second pixels in their respective ranges within which pixel values fall before the spatial filter process is carried out. For example, in a case where 0 to 255 are set (in a case of 256 tones) as a range of pixel values, pixel values of the first pixels are normally equal to or larger than "170", whereas pixel values of the second pixels are less than "170".

The range of pixel values between the first pixels and the second pixels can become smaller or can be eliminated after a spatial filter process allowing for a larger edge enhancement degree is carried out with the use of, for example, the filter coefficient illustrated in FIG. 11 (a). In view of the circumstances, according to Embodiment 1, in a case where it is necessary to reduce line noise, i.e., in a case where the line noise suppression mode is enabled, it is therefore possible to maintain the difference in a region of pixel values between the first pixels and the second pixels by carrying out, with the use of, for example, the filter coefficient of FIG. 11 (b) or FIG. 11 (c), a spatial filter process (in which an edge enhancement degree of an image is smaller than that obtained when the line noise suppression mode is disabled) with respect to pixels which are determined to be a text region.

The following description will discuss a process of the output tone correction section 109.

Figure 12:
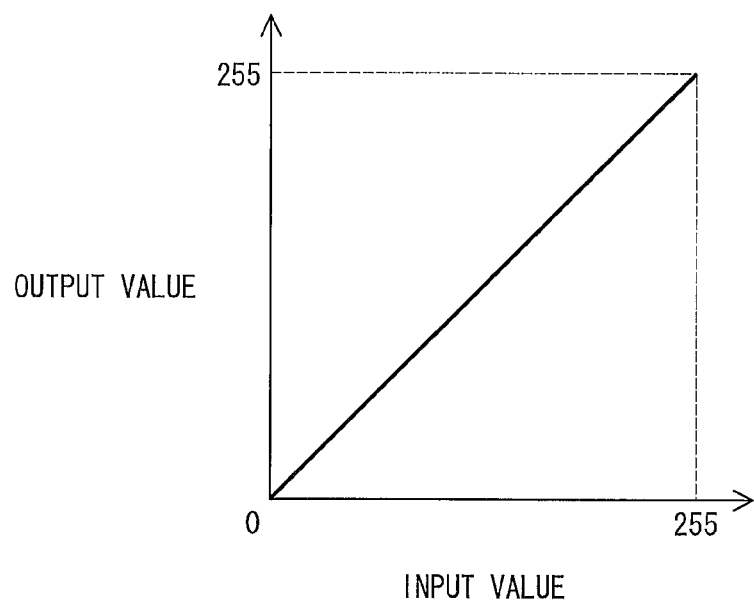
FIG. 12 is a view of an example curve (tone correction curve) illustrating a tone correction process with respect to a text region in a case were (i) a dithering process is carried out by a tone reproduction processing section and (ii) there is no need to reduce a line noise.
Figure 13:
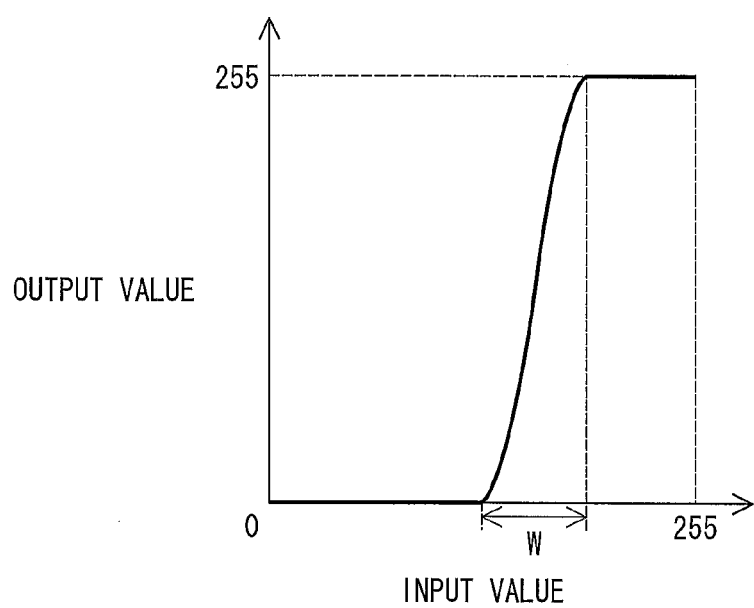
FIG. 13 is a view of an example of a tone correction curve, which illustrates a tone correction process with respect to a text region in a case were (i) a dithering process is carried out and (ii) it is necessary to reduce a line noise.
Figure 14:
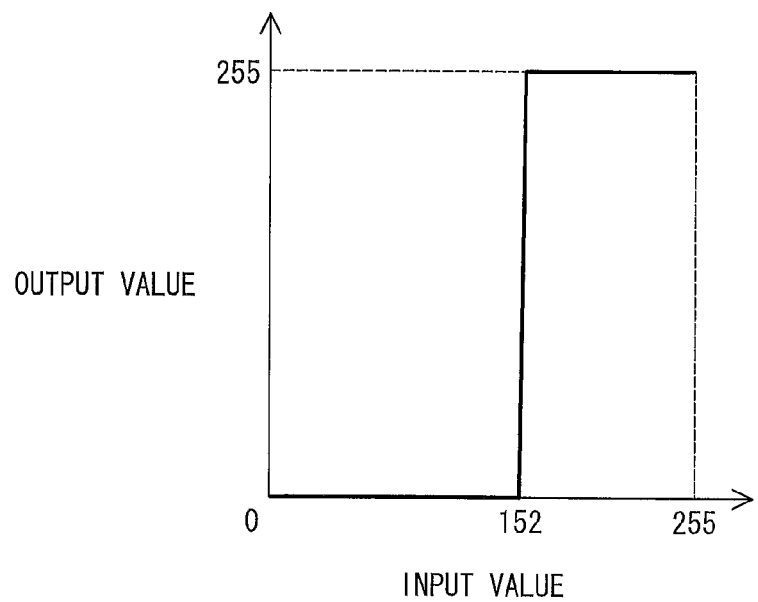
FIG. 14 is a view of another example of a tone correction curve, which illustrates a tone correction process with respect to a text region in a case were (i) a dithering process is carried out and (ii) it is necessary to reduce a line noise.

FIG. 12 is a view illustrating an example curve (tone correction curve) which indicates a tone correction process carried out with respect to a text region in a case where (i) the dithering process is carried out in the tone reproduction processing section 110 which follows the output tone correction section 109 as described in Embodiment 1 and (ii) there is no need to reduce line noise. FIG. 13 is a view illustrating an example tone correction curve which indicates a tone correction process carried out with respect to a text region in a case where (i) the dithering process is carried out and (ii) it is necessary to reduce line noise. FIG. 14 is a view illustrating another example tone correction curve which indicates a tone correction process carried out with respect to a text region in a case where (i) the dithering process is carried out and (ii) it is necessary to reduce line noise. In FIG. 12 through FIG. 14, a lateral axis represents an input value (density value) to be supplied to the tone reproduction processing section 110 and a longitudinal axis represents an output value (density value) to be supplied from the tone reproduction processing section 110.

In a case where the line noise suppression mode is disabled (in a case where there is no need to reduce line noise), the output tone correction section 109 carries out, with respect to a text region, a tone correction process indicated by the tone correction curve of FIG. 12. The tone correction process causes an input value to be outputted without any modification.

Meanwhile, in a case where the line noise suppression mode is enabled (in a case where it is necessary to reduce line noise), the output tone correction section 109 carries out, with respect to a text region, a tone correction process 13. The tone correction process causes (i) an output value to be increased at an extremely large rate in response to an increase in input value, within a relatively narrow range W in the vicinity of a halftone dot input value and (ii) an output value to be set to 0 (minimum output value) with respect to an input value smaller than the range W whereas an output value to be set to 225 (maximum output value) with respect to an input value larger than the range W.

In a case where such a tone correction process indicated by the tone correction curve is carried out, contrast of an image is enhanced. Accordingly, in a case where the output tone correction section 109 carries out the tone correction process indicated by the tone correction curve of FIG. 13, a contrast between an image in a text region and an image in the vicinity of the text region (background) is enhanced.

In a case where there is no need to carry out reproduction of intermediate density (halftone dot) with respect to the text region, the output tone correction section 109 carries out, for example, the tone correction process indicated by the tone correction curve of FIG. 14. The tone correction process causes an output value to be set to 0 (a minimum output value) when an input value is less than a predetermined value (e.g., 153) whereas an output value to be set to 255 (a maximum output value in a case where the image data is expressed by 8 bits) when the input value is equal to or larger than the predetermined value. The tone correction curves of FIG. 13 and FIG. 14 are example tone correction curves each indicative of a tone correction process in which a contrast enhancement degree of an image is high.

The difference between (i) the range of pixel values of the first pixels and (ii) the range of pixel values of the second pixels can be maintained by carrying out, with respect to pixels which are determined to be a text region by the segmentation process section 105, the spatial filter process in which the edge enhancement degree of the image is smaller than that obtained when the line noise suppression mode is disabled. Furthermore, out of the pixels determined to be in a text region, pixels of a text image (text, line) which is thicker than the line noise image in the document are set to a constant output value because they are subjected to the output tone correction process, of the output tone correction section 109, which causes the contrast enhancement degree of the image to be higher. Accordingly, the text image which is thicker than the line noise image in the document is reproduced. In contrast, in a case of pixels of the thin line corresponding to the line noise, output values of the pixels are set to 0 because they are subjected to the output tone correction process, of the output tone correction section 109, which causes the contrast enhancement degree of the image to be higher. As a result, the line noise image corresponding to the thin line is eliminated from the input image data.

Note that a relationship between (A) a pixel value (input value) of image data supplied to the output tone correction section 109 and (B) a pixel value (output value) of the image data supplied from output tone correction section 109 (hereinafter, referred to as an "input/output relationship") is determined on the basis of a characteristic of the image output section 4 and a process carried out by the tone reproduction processing section 110. Accordingly, in a case where the tone reproduction processing section 110 which follows the output tone correction section 109 carries out a dithering process which is changed in accordance with a type of a region indicated by a segmentation class signal which has been supplied from the segmentation process section 105 as described in Embodiment 1, it is preferable that the input/output relationship of the output tone correction section 109 is changed in accordance with the type of the dithering process.

Furthermore, the output tone correction process of the output tone correction section 109 can be carried out simultaneously with a multi-level dithering process of the tone reproduction processing section 110 by setting a relationship, between an input value (input density value) and a total output value in the dither matrix, in accordance with an output characteristic of the image output section 4. "Setting the relationship in accordance with the output characteristic of the image output section 4" means that the relationship (between the input value (input density value) and total output value in each cell of the dither matrix) is set so that a target tone correction characteristic is obtained. To put it another way, in a case where the output tone correction process is carried out while the multi-level dithering process of the tone reproduction processing section 110 is carried out, the tone correction process (γ correction in an image output apparatus) carried out by the output tone correction section 109 is included in the multi-level dithering process of the tone reproduction processing section 110. In this case, the output tone correction section 109 does not carry out any process, or carries out almost no process (process of correction curve of FIG. 12).

Figure 10:
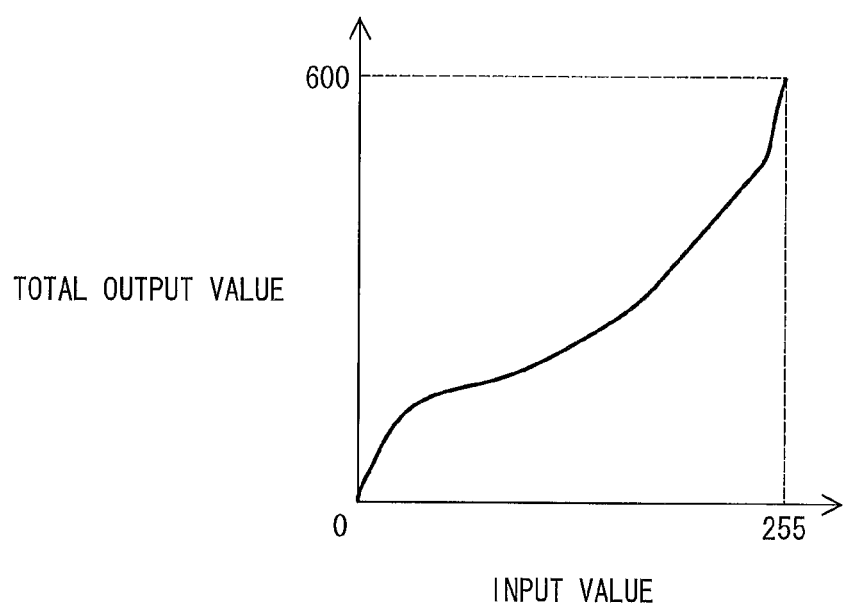
FIG. 10 is a view illustrating an example of a relationship between (i) an input value of regions other than an edge region and (ii) a total sum of output values of respective cells.

FIG. 10 is a view illustrating an example relationship between an input value and a total output value in each cell of a dither matrix in regions other than edge region. As illustrated in FIG. 10, in a case where 0 to 255 are set as the range of an input value in the multi-level dithering process, each pixel can have density values of 15×40=600 tones. This is because the number of cells contained in the dither matrix (one pixel) is 40 and each cell can output 15 output values, and accordingly, a range of a total sum (total output value) in each cell can be 0 through 600.

The foregoing fifteen (15) thresholds and the sixteen (16) output values in each cell are set on the basis of the relationship between the input value and the total output value. That is, the fifteen (15) thresholds and the sixteen (16) output values are set so that the relationship between the input value and the total output value becomes an ideal relationship.

Note that the relationship between the input value and the total output value in each cell of the dither matrix of FIG. 10 in the dithering process for the edge region can (i) be different from that in the dithering process for regions other than the edge region or (ii) be the same relationship as that in the dithering process for regions other than the edge region.

In Embodiment 1 as described above, in a case where the line noise suppression mode in which the line noise image which does not exist in the document image for the input image data but exists in the input image data is suppressed is enabled by the mode setting section 81, the spatial filter process section 108 executes the spatial filter process with respect to the text pixels which have determined to be included in the text region by the segmentation process section 105, in which spatial filter process the edge enhancement degree of the image is smaller than that obtained when the line noise suppression mode is disabled. Further, the output tone correction section 109 executes, with respect to the text pixels subjected to the spatial filter process in which the edge enhancement degree of the image is smaller than that obtained when the line noise suppression mode is disabled, a tone correction process in which the contrast enhancement degree of the image is higher than that obtained when the line noise suppression mode is disabled. The spatial filter process section and the output tone correction section execute the processes as described above, so that it becomes possible to eliminate a line noise image (line noise image data) which does not exist in a document image but exists in input image data corresponding to the document image, or to make the line noise image as less visible as possible.

According to the image forming apparatus 1 of Embodiment 1, there is no need to detect a location of a line noise image with the use of a complicated operation control and it is easily possible (i) to eliminate a line noise image which does not exist in a document image but exists in input image data corresponding to the document image or (ii) to make the line noise image as less visible as possible irrespective of the number of document sheets (i.e., irrespective of one sheet or a plurality of sheets).

The following description will discuss in which case the mode setting section 81 enables the line noise suppression mode. For example, the mode setting section 81 can be arranged so as to enable the line noise suppression mode when the operating section 7 accepts, from a user, an instruction on enabling the line noise suppression mode. With the arrangement, a user can enable the line noise suppression mode in a case where the user wants to enable the mode. Examples of such a case include a case where a user finds a line noise image by checking a preview display or by checking a last document.

Alternatively, the mode setting section 81 can determine, in accordance with the document type, whether or not the line noise suppression mode is enabled. For example, the mode setting section 81 can enable the line noise suppression mode in a case where a document is a text document, including a text, such as a text/printed-picture document and a text/photograph document) and otherwise disable the line noise suppression mode. This is based on the fact that, in a case where a document is a document which does not contain any text, such as a whole printed-picture or a photograph, a process for reducing line noise causes almost no effect. By setting the mode setting section 81 as described above, it is possible to prevent the mode setting section 81 from carrying out a useless line-noise reduction process.

Note that the mode setting section 81 can receive a document type as a result determined by the document type determining section 104. Alternatively, a user can enter a document type from the operating section (document type selection section) 7, and the mode setting section 81 can receive the entered document type by the user. In this case, the mode setting section 81 also functions as a document type discrimination section. The mode setting section 81 enables the line noise suppression mode upon reception of information indicating that the document type is a text document.

Alternatively, the image forming apparatus 1 can be configured so as to include a detection section for detecting a line noise image and so that the mode setting section 81 enables the line noise suppression mode when the detection section detects a line noise image.

In the above description, the case where the mode setting section 81 automatically enables the line noise suppression mode when the document type determining section 104 determines that the document type is a text document or when the document type is specified as a text document from the operating section 7. Alternatively, the operating section 7 can be configured so as to accept the instruction on enabling the line noise suppression mode when the document type determining section 104 determines that the document type is a text document or when the document type is specified as a text document from the operating section 7. According to the configuration, when the document type determining section 104 determines that the document type is a text document or when the document type is specified as a text document from the operating section 7, a user can enable (select, specify) the line noise suppression mode from the operating section 7.

In the description, the text region includes a black text region and a color text region. Note, however, that, in a case where (i) the text region includes both the black text region and the color text region and (ii) the line-noise reduction process is carried out, color tones of a relatively thick color-line (a chromatic color line) and a color text (a chromatic color text), each of which reproduction is kept, are sometimes changed. In view of the circumstances, it is possible to prevent the color tones of the color line and the color text from changing, by carrying out the line-noise reduction process while the text region is limited to the black text region. It is possible to determine whether pixels are a chromatic color or achromatic color by employing, for example, the foregoing determination method with the use of the segmentation process section 105.

Embodiment 2

Embodiment 2 is different from Embodiment 1 mainly in that, instead of the dithering process, an error diffusion process (described later) is carried out as a tone reproduction process which is carried out by a tone reproduction processing section 110. The following description will merely discuss an arrangement different from that of Embodiment 1, and the description of an arrangement in common with or similar to that of Embodiment 1 will therefore be omitted.

An output tone correction section 109 carries out an output tone correction process in which CMYK signals supplied from a spatial filter process section 108 are corrected, with the use of the error diffusion process, in accordance with a characteristic value of an image output section 4. The output tone correction section 109 supplies, to the tone reproduction processing section 110, the CMYK signals which have been subjected to the output tone correction process.

The tone reproduction processing section 110 receives CMYK signals, for each pixel, from the output tone correction section 109, and then subsequently carries out the error diffusion process with respect to the CMYK signals. In the error diffusion process, the same process is carried out regardless of a type of a region (a text region or the like) indicated by a synchronizing segmentation class signal received from the segmentation process section 105. Alternatively, the error diffusion process can be carried out with respect to the CMYK signals in accordance with the type of the region.

Figure 15:
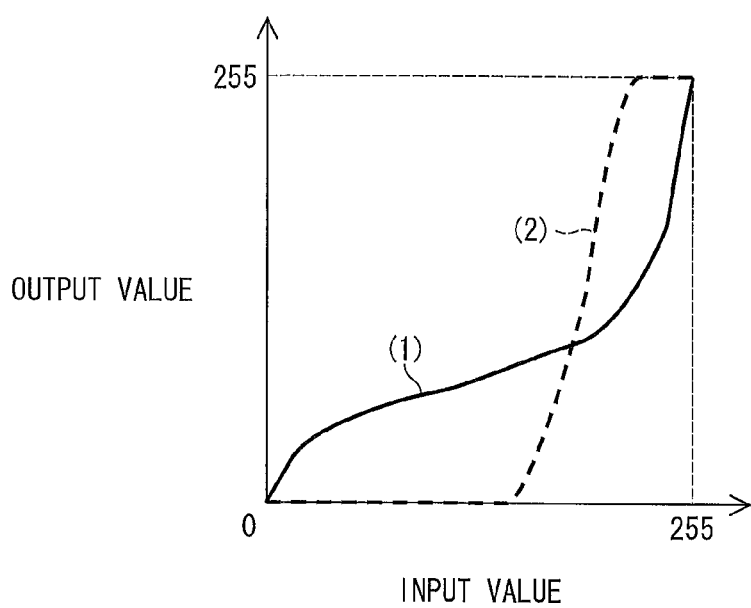
FIG. 15 illustrates an example (1) of a tone correction curve which indicates a tone correction process with respect to a text region in a case where an error diffusion process is carried out but line noise is not reduced in a tone reproduction processing section, and also illustrates an example (2) of a tone correction curve which indicates a tone correction process with respect to a text region in a case where an error diffusion process is carried out in a tone reproduction processing section and line noise is reduced.

A curve (1) of FIG. 15 is an example tone correction curve illustrating a tone correction process with respect to a text region in a case where the tone reproduction processing section 110 carries out the error diffusion process as described in Embodiment 2 but does not reduce line noise (line noise suppression mode is disabled). A curve (2) is an example tone correction curve illustrating a tone correction process with respect to a text region in a case where the tone reproduction processing section 110 carries out the error diffusion process and reduces line noise (a line noise suppression mode is enabled).

Normally (in a case where the line noise is not reduced), the output tone correction section 109 carries out the tone correction process illustrated by the tone correction curve (1) with respect to pixels (input values) in the text region, like pixels in regions other than the text region. In the tone correction process, a halftone dot area ratio is converted in accordance with the characteristic of the image output section 4 through the error diffusion process.

Meanwhile, in a case where line noise is reduced, the tone correction process (indicated by the tone correction curve (2)) for providing contrast enhancement is carried out with respect to pixels of the text region while the output tone correction section 109 carries out the output tone correction with respect to the pixels in accordance with the normal characteristic of the image output section 4.

Accordingly, similarly to Embodiment 1, in a case where the line noise is reduced, among pixels which have been determined to be included in a text region by the segmentation process section 105, a process, in which a difference between (i) a range of pixel values of first pixels corresponding to a thin line indicative of line noise and (ii) a range of pixel values of second pixels corresponding to a not-thin text existing in the document is maintained, is carried out by the spatial filter process section 108. After that, the difference is enhanced by the output tone correction section 109.

That is, among the pixels which have been determined to be included in the text region, a part corresponding to the thin line is eliminated and parts, such as a line which is not narrow and a text, are kept to be reproduced.

This makes it possible to eliminate a relatively thin line noise or to make the line noise less visible even if the line noise is added to an image while a document image is being read.

Note that, in the above description, the tone correction process (tone correction curve) is switched depending on whether or not the line noise is reduced. Embodiment 2 is, however, not limited to this. Alternatively, the tone correction process can be fixed in advance so as to be carried out on the basis of the tone correction curve obtained when the line noise is reduced, irrespective of whether or not the line noise is reduced.

That is, in a case where line noise is reduced, correction in which contrast enhancement is obtained is also carried out. This will reduce the importance of output tone correction made in accordance with an output characteristic of the image output section 4. To put it another way, there causes not-so-enormous discrepancy between images, whether or not a tone correction curve is switched in accordance with a change of the image output section 4 serving as an external apparatus. In view of the circumstances, it is possible to use a constant tone correction curve, instead of a tone correction curve which is formed in accordance with a change in image output section 4.

Embodiment 3

Figure 16:
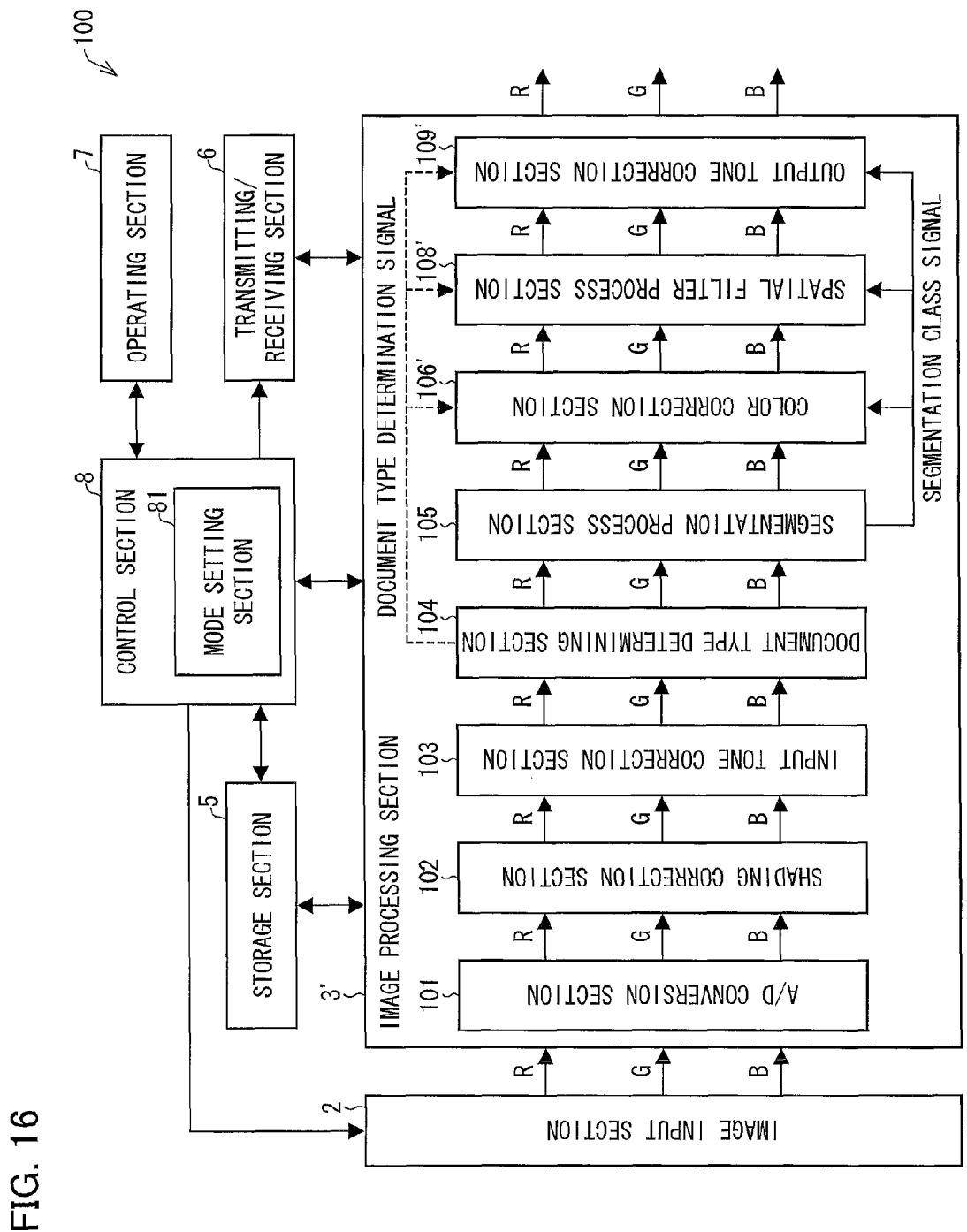
FIG. 16 is a block diagram illustrating a configuration of an image reading apparatus which is one embodiment of the present invention.

FIG. 16 is a block diagram illustrating an arrangement of an image reading apparatus in accordance with Embodiment 3 of the present invention. Note that, out of respective members constituting an image reading apparatus 100 of FIG. 16, members in common with members which also constitute the image forming apparatus 1 of Embodiment 1 are denoted by the same symbols, and their detailed descriptions are omitted.

As illustrated in FIG. 16, the image reading apparatus 100 includes an image input section 2, an image processing section 3', a storage section 5, a transmitting/receiving section 6, an operating section 7, and a control section 8.

Note that the image processing section 3' does not include the black generation and under color removal section 107 and the tone reproduction processing section 110 in the image processing section 3 of the image forming apparatus 1 in accordance with Embodiment 1. Also note that, in the image processing section 3', image data is supplied to the segmentation process section 105, and then is supplied to a color correction section 106', a spatial filter process section 108', and an output tone correction section 109' in this order.

The color correction section 106' carries out a color correction process, in accordance with a characteristic of the image input section 2, with respect to RGB signals which are supplied from the segmentation process section 105. The color correction section 106' supplies the RGB signals, which have been subjected to the color correction process, to the spatial filter process section 108'.

The spatial filter process section 108' carries out a spatial filter process with respect to the RGB signals supplied from the color correction section 106'. The spatial filter process section 108' supplies the RGB signals corrected to the output tone correction section 109'.

The output tone correction section 109' carries out an output tone correction process with respect to the RGB signals, supplied from the spatial filter process section 108', in accordance with a type of a region indicated by a segmentation class signal which (i) has been supplied from the segmentation process section 105 and (ii) is synchronized with the RGB signals.

In Embodiment 3, the output tone correction section 109' carries out a process with respect to the RGB signals in place of CMYK signals. Because of this, the relationship between input values and output values become reversed in terms of shading.

Specifically, the respective CMYK signals become light in color as pixel values become close to "0," and become deep in color as pixel values become close to "255". Meanwhile, the RGB signals become light in color as pixel values become close to "255", and become light in color as pixel deep as pixel values become close to "0".

Accordingly, a tone correction curve indicative of the tone correction process, which is carried out by the output tone correction section 109', becomes a curve obtained by rotating by 180° the tone correction curve in Embodiment 1 (tone correction curve of FIG. 12 to FIG. 14).

According to Embodiment 3, since the tone correction process is carried out by the output tone correction section 109', (i) a part corresponding to a thin line is eliminated whereas (ii) a line which is not narrow and a part of a text are kept to be reproduced, out of pixels which have been determined to be included in a text region.

This makes it possible to eliminate a line noise image appearing in input image data or to make the line noise image as less visible as possible.

Note that it is also possible in the image forming apparatus 1 of Embodiment 1 that the output tone correction section 109 carries out a process with respect to RGB signals in place of the CMYK signals. Specifically, the color correction section 106 outputs RGB signals in place of CMY signals, the black generation and under color removal section 107 outputs the RGB signals as they are, without generating a K signal (black generation). Then the spatial filter process section 108 and the output tone correction section 109 receive the RGB signals, and carry out processing similar to that of Embodiment 1. The tone reproduction processing section 110 receives the RGB signals and outputs them as they are. This allows the image forming apparatus 1 to realize an arrangement in which image data obtained by the reading operation is outputted to an external apparatus, instead of being printed out.

Embodiment 4

Each of the control section 8 and the image processing sections 3 and 3' can be realized by a hardware logic or can be realized by a CPU and software as follows.

Specifically, each of the control section 8 and the image processing sections 3 and 3' includes (i) a CPU (central processing unit) which executes commands of a control program for realizing respective functions of the sections 8, 3, and 3', (ii) a ROM (read only memory) in which the program is stored, (iii) a RAM (random access memory) in which the program is developed, and (iv) a recording apparatus (recording medium), such as a memory, in which the program and various kinds of data are stored.

Alternatively, it is possible to realize functions of the control section 8 and the image processing sections 3 and 3' by (A) providing, to each of the control section 8 and the image processing section 3 and 3', a recording medium in which computer-readably program codes (execution mode program, intermediate code program, and source program) of a program serving as software for realizing the control section 8 and the image processing section 3 and 3' are stored, (B) causing the computer (or CPU or MPU) to read out the program codes stored in the recording medium, and (C) causing the computer (or CPU or MPU) to execute the program codes. This makes it possible to provide a freely portable recording medium in which an image processing program for carrying out the image processing method is stored.

In Embodiment 4, since a microcomputer carries out the processing, it is possible to employ, as the recording medium, a memory (not illustrated) such as a ROM itself, a program medium. Alternatively, it is possible to employ, as the recording medium, a program medium which can be read by loading, with the recording medium, a program reading apparatus (not illustrated) serving as an external recording apparatus.

In any cases, the program stored in the recording medium can be accessed and executed by the microprocessor or the program codes can be (a) read out, (b) downloaded to a program storage area (not illustrated) of the microcomputer, and then (c) executed. Note that a program for downloading is stored in a main apparatus in advance.

The program medium is a recording medium which is separately from the main apparatus, and can be a medium which hold the program codes. Examples of the recording medium include: tapes such as a magnetic tape and a cassette tape; disks such as magnetic disks (e.g., a floppy (registered trademark) disk and a hard disk) and optical disks (e.g., a CD-ROM, an MO, an MD, a DVD, and a CD-R); cards such as an IC card (including a memory card) and an optical card; and semiconductor memories (e.g., a mask ROM, an EPROM (erasable programmable read only memory), an EEPROM (electrically erasable programmable read only memory) (registered trademark), and a flash ROM).

Furthermore, in Embodiment 4, the recording medium can be a medium which bears the program codes so that the program codes are downloaded from a communication network, provided that any one of the control section 8 or the image processing sections 3 and 3' are arranged so as to be connectable with a communication network including the Internet.

The communication network is not particularly limited, and examples of the communication network include the Internet, an intranet, an extranet, a LAN, an ISDN, a VAN, a CATV communication network, a virtual private network, a telephone network, a mobile communication network, and a satellite communication network. In addition, a transmission medium constituting the communication network is not particularly limited, and examples of the transmission medium include: wired transmission media such as IEEE1394, a USB, a power-line carrier, a cable TV line, a telephone line, and an ADSL; and wireless transmission media such as infrared rays (e.g., IrDA and a remote controller), Bluetooth (registered trademark), 802.11 wireless, an HDR, a cell-phone network, and a satellite line, and a digital terrestrial network.

In a case where the program codes are downloaded from the communication network, the program for downloading can be stored in the main apparatus in advance or can be installed from another recording medium. Note that the present invention can be also realized in the form of a computer signal which (i) has the program codes embodied by electronic transmission and (ii) is embedded in a carrier wave.

The image processing method is carried out by causing the recording medium to be read by a program reading apparatus included in a digital color image forming apparatus or a computer system.

(Arrangement of the Present Invention)

As described above, an image processing apparatus in accordance with the present invention includes: a region discrimination section for discriminating regions to which respective pixels of input image data belong so as to determine at least a text region; a spatial filter process section for carrying out a spatial filter process with respect to the input image data in accordance with a result discriminated by the region discrimination section; an output tone correction section for carrying out a tone correction process with respect to the input image data in accordance with the result discriminated by the region discrimination section; and a mode setting section for enabling a line noise suppression mode in which a line noise image which does not exist in a document image of the input image data but exists in the input image data is suppressed, wherein, in a case where the line noise suppression mode is enabled by the mode setting section: the spatial filter process section carries out the spatial filter process with respect to a text pixel which has been determined to be included in a text region by the region discrimination section, in which spatial filter process an edge enhancement degree of an image is smaller than that obtained when the line noise suppression mode is disabled, and the output tone correction section carries out the tone correction process with respect to the text pixel which has been subjected to the spatial filter process, in which tone correction process a contrast enhancement degree of an image is higher than that obtained when the line noise suppression mode is disabled.

According to the foregoing arrangement, in a case where a line noise suppression mode which suppresses a line noise image which does not exist in a document image for input image data but exists in the input image data is enabled, the spatial filter process section executes the spatial filter process, in which an edge enhancement degree of an image is smaller than that obtained when the line noise suppression mode is disabled, with respect to a text pixel which has been determined to be included in the text region by the region discrimination section. Further, the output tone correction section executes the tone correction process, in which a contrast enhancement degree of an image is higher than that obtained when the line noise suppression mode is disabled, with respect to the text pixel subjected to the spatial filter process.

Generally, a line noise image which does not exist in a document image for input image data but exists in the input image data corresponding to the document image is caused by (i) a foreign matter (such as dust or paper dust from paper) which is adhered to a top surface of a scanner platen or (ii) a scratch on the scanner platen. The line noise image caused by the foreign matter or the scratch is a line narrower than a text image existing in the document image. Accordingly, there is a difference between (i) a range of pixel values of an image which is a line noise image and (ii) a range of pixel values of pixels which are a text image existing in the document image. Those image and pixels are both visually recognized (discriminated) as text pixels in the region discrimination section. However, if the spatial filter process in which an edge enhancement degree of an image is large is carried out, the difference (between (i) the range of the pixel values of the first pixels corresponding to the thin line noise image and (ii) the range of the pixel values of the pixels corresponding to the text image which is thicker than the line noise image and exists in the document image) becomes smaller or disappears after the spatial filter process is carried out.

However, by carrying out, with respect to the text pixels determined by the region discrimination section, the spatial filter process in which the edge enhancement degree of the image is smaller than that obtained when the line noise suppression mode is disabled as described in the foregoing arrangement of the present invention, it is possible to maintain the difference between (i) the range of the first pixels corresponding to the line noise image and (ii) the range of the second pixels corresponding to the text image existing in the document image. Further, as described in the foregoing arrangement of the present invention, by carrying out, with respect to the text pixel subjected to the spatial filter process, the tone correction process in which the contrast enhancement degree of the image is higher than that obtained when the line noise suppression mode is disabled, it is possible to enhance the difference between the ranges of the pixel values. To put it another way, the first pixels corresponding to a text image thicker than a line noise image are reproduced as an image in which the pixels are mostly set to a constant output value, meanwhile, the second pixels corresponding to a thin line corresponding to a line noise image are set to be a no-image state and are then eliminated.

As described above, in the present invention, when the line noise suppression mode is enabled, the spatial filter process section and the output tone correction section execute the foregoing process. This makes it possible to eliminate a line noise image (line noise image data) which does not exist in a document image for input image data but exists in the input image data corresponding to the document image, or to make the line noise image as less visible as possible. Therefore, in the present invention, there is no need to detect a location of a line noise image with the use of a complicated operation control and it is easily possible (i) to eliminate a line noise image which does not exist in a document image but exists in input image data corresponding to the document image or (ii) to make the line noise image as less visible as possible irrespective of the number of document sheets (i.e., irrespective of one sheet or a plurality of sheets).

The image processing apparatus in accordance with the present invention may further include, in addition to the foregoing arrangement, an accepting section for accepting an instruction input from a user, the mode setting section enabling the line noise suppression mode when the accepting section accepts the instruction input for enabling the line noise suppression mode.

According to the foregoing arrangement, the mode setting section can enable the line noise suppression mode by receiving the instruction input for enabling the line noise suppression mode from a user. This makes it easily possible (i) to enable the line noise suppression mode and (ii) to eliminate a line noise image which does not exist in a document image for input image data but exists in the input image data or to make the line noise image as less visible as possible.

In addition to the arrangement, in the image processing apparatus in accordance with the present invention, the region discrimination section may further determine whether each of the pixels included in the input image data is a chromatic color or an achromatic color; and the text pixel may be a text pixel which has been determined to be an achromatic color by the region discrimination section.

In a case where an achromatic color text pixel and a chromatic color text pixel, which exist as text pixels, are subjected to the spatial filter process and the tone correction process while the line noise suppression mode is enabled, color tones of a relatively thick color-line (chromatic color line) and a color text (chromatic color text) to be reproduced are sometimes changed. In view of the circumstances, as described in the foregoing arrangement of the present invention, only a text pixel determined to be an achromatic color by the region discrimination section is subjected to the spatial filter process and the tone correction process while the line noise suppression mode is enabled. This makes it possible to suppress the change in color tones of a color line and a color text.

In addition to the arrangement, the image processing apparatus in accordance with the present invention may further include a document type discrimination section for determining a document type of the input image data, the mode setting section enabling the line noise suppression mode in a case where the document type discrimination section determines that the document type of the input image data is a text document containing a text.

In most cases, it is ineffective to carry out the spatial filter process and the tone correction process with respect to a document which does not include any text (such as a whole printed-picture and a photograph) while the line noise suppression mode is enabled. In view of the circumstances, as described in the foregoing arrangement of the present invention, only a text pixel determined to be achromatic color by the region discrimination section is subjected to the spatial filter process and the tone correction process while the line noise suppression mode is enabled. This makes it possible to prevent a useless process from being carried out.

In addition to the arrangement, the image processing apparatus in accordance with the present invention may further include a document type selection section for accepting a user's specifying of a document type of the input image data, the mode setting section enabling the line noise suppression mode in a case where the document type selection section accepts the user's specifying, as the document type of the input image data, a text document.

According to the arrangement, the mode setting section enables the line noise suppression mode in a case where the document type selection section accepts the user's specifying, as the document type of the input image data, a text document. It is therefore possible to enable the line noise suppression mode by accepting the user's specifying, as the document type of the input image data, a text document.

Further, in addition to the arrangement, the image processing apparatus in accordance with the present invention may further include a document type discrimination section for determining a document type of the input image data, the accepting section being capable of accepting the instruction input for enabling the line noise suppression mode in a case where the document type discrimination section determines that the document type of the input image data is a text document containing a text.

According to the arrangement, in a case where the document type discrimination section determines that the document type of the input image data is a text document including a text, the accepting section can accept the instruction input for enabling the line noise suppression mode. To put it another way, a user can enable (select, specify) the line noise suppression mode from the receiving section in a case where it is determined that a document is a text document.

Furthermore, in addition to the arrangement, the image processing apparatus in accordance with the present invention may further include a document type selection section for accepting a user's specifying of a document type of the input image data, the accepting section being capable of accepting the instruction input for enabling the line noise suppression mode in a case where the document type selection section accepts the user's specifying, as the document type of the input image data, a text document containing a text.

According to the arrangement, it is possible to accept the instruction input for enabling the line noise suppression mode in a case where the document type selection section accepts a user's specifying, as the document type of the input image data, a text document. To put it another way, a user can enable (select, specify) the line noise suppression mode from the receiving section in a case where a document is specified to be a text document.

In addition to the arrangement, in the image processing apparatus in accordance with the present invention, the spatial filter process section in the spatial filter process, in which the edge enhancement degree of the image is smaller, can employ (i) a filter coefficient which smoothes an input pixel value or (ii) a filter coefficient which outputs, as an output pixel value, the input pixel value without any modification.

According to the arrangement, the spatial filter process section carries out the spatial filter process with the use of a filter coefficient which smoothes an input pixel value or a filter coefficient which outputs the input pixel value without any modification as an output pixel value. This makes it possible to effectively carry out the spatial filter process in which the edge enhancement degree of the image with respect to a text pixel is smaller than that obtained when the line noise suppression mode is disabled.

In addition to the arrangement, in the image processing apparatus in accordance with the present invention, the output tone correction section can employ, in the tone correction process in which the contrast enhancement degree of the image is higher, a tone correction curve for allowing the contrast enhancement to be obtained with respect to the text region.

According to the arrangement, by employing the tone correction curve for providing the contrast enhancement to the text region, the output tone correction section can effectively carry out the tone correction process in which the contrast enhancement degree of the image with respect to a text pixel is higher than that obtained when the line noise suppression mode is disabled.

An image forming apparatus in accordance with the present invention includes: any one of the image processing apparatuses; and an image output apparatus for outputting output image data based on the input image data.

According to the foregoing arrangement, even if the input image data includes a line noise image which does not exist in a document image, the present invention can provide an image forming apparatus which can easily output (e.g., print or transmit) output image data in which the line noise image is eliminated or is less visible as possible.

An image forming apparatus in accordance with the present invention includes: any one of the image processing document image and generating input image data.

According to the foregoing arrangement, even if input image data which has been read and generated in the image input apparatus includes a line noise image which does not exist in a document image, it is easily possible to generate image data in which the line noise image is eliminated or is less visible as possible.

An image processing method in accordance with the present invention includes the steps of: (a) discriminating regions to which respective pixels of input image data belong so as to determine at least a text region; (b) carrying out a spatial filter process with respect to the input image data in accordance with a result discriminated in the step (a); (c) carrying out a tone correction process with respect to the input image data in accordance with the result discriminated in the step (a); and (d) enabling a line noise suppression mode in which a line noise image which does not exist in a document image of the input image data but exists in the input image data is suppressed, wherein, in a case where the line noise suppression mode is enabled in the step (d): in the step (b) the spatial filter process is carried out with respect to a text pixel which has been determined to be included in a text region in the step (a), in which spatial filter process the edge enhancement degree of the image is smaller than that obtained when the line noise suppression mode is disabled, and in the step (c), the tone correction process is carried out with respect to the text pixel which has been subjected to the spatial filter process, in which tone correction process the contrast enhancement degree of the image is higher than that obtained when the line noise suppression mode is disabled.

According to the foregoing method, the present invention has an effect similar to that of the image processing apparatus. In the image forming apparatus 1 of Embodiment 4, there is no need to detect a location of a line noise image with the use of a complicated operation control and it is easily possible (i) to eliminate a line noise image which does not exist in a document image but exists in input image data corresponding to the document image or (ii) to make the line noise image as less visible as possible irrespective of the number of document sheets (i.e., irrespective of one sheet or a plurality of sheets).

Further, the image processing apparatus of the present invention may be realized by a computer. In this case, (A) a control program for realizing the control apparatus with the use of a computer by operating the computer as members of the image processing apparatus and (B) a recording medium in which the computer-readably control program is stored are also included within the scope of the present invention.

The arrangement can provide the same effect as that of the image processing apparatus by causing the computer to read and to execute the control program.

The invention being described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention can be used to an apparatus which treats input image data obtained in an image reading apparatus for carrying a document. For example, the present invention is particularly suitable for a multifunction peripheral, a copying machine, a scanner, a printer, and a facsimile machine.

REFERENCE SIGNS LIST 1 image forming apparatus
2 image input section (image input apparatus)
3, 3' image processing section (image processing apparatus)
5 storage section
7 operating section (receiving section, document type selection section)
8 control section
81 mode setting section
100 image reading apparatus
104 document type automatically discrimination section (document type discrimination section)
105, 105' segmentation process section (region discrimination section)
108, 108' spatial filter process section
109, 109' output tone correction section

The invention claimed is:
1. An image processing apparatus, comprising:
a region discrimination section for discriminating regions to which respective pixels of input image data belong so as to determine at least a text region;
a spatial filter process section for carrying out a spatial filter process with respect to the input image data in accordance with a result discriminated by the region discrimination section;
an output tone correction section for carrying out a tone correction process with respect to the input image data in accordance with the result discriminated by the region discrimination section; and
a mode setting section for enabling a line noise suppression mode in which a line noise image which does not exist in a document image of the input image data but exists in the input image data is suppressed,
wherein, in a case where the line noise suppression mode is enabled by the mode setting section:
the spatial filter process section carries out the spatial filter process with respect to a text pixel which has been determined to be included in a text region by the region discrimination section, in which in the spatial filter process, an edge enhancement degree of an image is smaller than that obtained when the line noise suppression mode is disabled, and the output tone correction section carries out the tone correction process with respect to the text pixel which has been subjected to the spatial filter process, in which in the tone correction process, a contrast enhancement degree of an image is higher than that obtained when the line noise suppression mode is disabled.

2. The image processing apparatus as set forth in claim 1, further comprising:
an accepting section for accepting an instruction input from a user,
the mode setting section enabling the line noise suppression mode when the accepting section accepts an instruction input for enabling the line noise suppression mode.

3. The image processing apparatus as set forth in claim 1, wherein:
the region discrimination section further determines whether each of the pixels included in the input image data is a chromatic color or an achromatic color; and
the text pixel is a text pixel which has been determined to be an achromatic color by the region discrimination section.

4. The image processing apparatus as set forth in claim 1, further comprising:
a document type discrimination section for determining a document type of the input image data,
the mode setting section enabling the line noise suppression mode in a case where the document type discrimination section determines that the document type of the input image data is a text document containing a text.

5. The image processing apparatus as set forth in claim 1, further comprising:
a document type selection section for accepting a user's specifying of a document type of the input image data,
the mode setting section enabling the line noise suppression mode in a case where the document type selection section accepts the user's specifying, as the document type of the input image data, a text document.

6. The image processing apparatus as set forth in claim 2, further comprising:
a document type discrimination section for determining a document type of the input image data,
the accepting section being capable of accepting the instruction input for enabling the line noise suppression mode in a case where the document type discrimination section determines that the document type of the input image data is a text document containing a text.

7. The image processing apparatus as set forth in claim 2, further comprising:
a document type selection section for accepting a user's specifying of a document type of the input image data,
the accepting section being capable of accepting the instruction input for enabling the line noise suppression mode in a case where the document type selection section accepts the user's specifying, as the document type of the input image, a text document containing a text.

8. The image processing apparatus as set forth in claim 1, wherein
the spatial filter process section in the spatial filter process, in which the edge enhancement degree of the image is smaller, employs (i) a filter coefficient which smoothes an input pixel value or (ii) a filter coefficient which outputs, as an output pixel value, the input pixel value without any modification.

9. The image processing apparatus as set forth in claim 1, wherein
the output tone correction section employs, in the tone correction process in which the contrast enhancement degree of the image is higher, a tone correction curve for allowing the contrast enhancement to be obtained with respect to the text region.

10. An image forming apparatus, comprising:
the image processing apparatus recited in claim 1; and
an image output apparatus for outputting output image data based on the input image data.

11. An image reading apparatus, comprising:
the image processing apparatus recited in claim 1; and
an image input apparatus for reading a document image and generating input image data.

12. An image processing method, comprising the steps of:
(a) discriminating regions to which respective pixels of input image data belong so as to determine at least a text region;
(b) carrying out a spatial filter process with respect to the input image data in accordance with a result discriminated in the step (a);
(c) carrying out a tone correction process with respect to the input image data in accordance with the result discriminated in the step (a); and
(d) enabling a line noise suppression mode in which a line noise image which does not exist in a document image of the input image data but exists in the input image data is suppressed,
wherein, in a case where the line noise suppression mode is enabled in the step (d):
in the step (b) the spatial filter process is carried out with respect to a text pixel which has been determined to be included in a text region in the step (a), in which in the spatial filter process an edge enhancement degree of an image is smaller than that obtained when the line noise suppression mode is disabled, and
in the step (c), the tone correction process is carried out with respect to the text pixel which has been subjected to the spatial filter process, in which in the tone correcting process a contrast enhancement degree of an image is higher than that obtained when the line noise suppression mode is disabled.

13. A non-transitory computer-readable recording medium in which an image processing program is stored for causing a computer to function as sections of the image processing apparatus recited in claim 1.

* * * * *